(12) United States Patent
Shimamura et al.

(10) Patent No.: US 7,480,785 B2
(45) Date of Patent: Jan. 20, 2009

(54) PARALLEL PROCESSING DEVICE AND PARALLEL PROCESSING METHOD

(75) Inventors: Toshishige Shimamura, Kanagawa (JP); Hiroki Morimura, Kanagawa (JP); Koji Fujii, Kanagawa (JP); Satoshi Shigematsu, Kanagawa (JP); Katsuyuki Machida, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 584 days.

(21) Appl. No.: 10/505,718

(22) PCT Filed: Feb. 13, 2004

(86) PCT No.: PCT/JP2004/001526

§ 371 (c)(1),
(2), (4) Date: Aug. 23, 2004

(87) PCT Pub. No.: WO2004/104819

PCT Pub. Date: Dec. 2, 2004

(65) Prior Publication Data

US 2005/0259502 A1    Nov. 24, 2005

(30) Foreign Application Priority Data

May 23, 2003 (JP) .............................. 2003-146723
Jul. 4, 2003   (JP) .............................. 2003-271037

(51) Int. Cl.
*G06F 15/00* (2006.01)
*G06F 15/76* (2006.01)

(52) U.S. Cl. .......................................... 712/16; 712/22

(58) Field of Classification Search ............. 712/10–22; 348/720–721; 345/501–522; 708/514, 629–630; 382/181

See application file for complete search history.

(56) References Cited

U.S. PATENT DOCUMENTS

| | | | | |
|---|---|---|---|---|
| 4,399,517 A | * | 8/1983 | Niehaus et al. | 708/210 |
| 4,660,165 A | * | 4/1987 | Masumoto | 708/712 |
| 4,901,269 A | * | 2/1990 | Stoelzle | 708/714 |
| 5,148,388 A | * | 9/1992 | Parmar et al. | 708/706 |
| 5,187,679 A | * | 2/1993 | Vassiliadis et al. | 708/706 |
| 5,291,443 A | * | 3/1994 | Lim | 365/189.04 |
| 5,379,444 A | * | 1/1995 | Mumme | 712/11 |

(Continued)

FOREIGN PATENT DOCUMENTS

JP    06-187405 A    7/1994

(Continued)

OTHER PUBLICATIONS

Gealow et. al., "System Design for Pixel-Parallel Image Processing", IEEE Transaction on very large scale integration systems, vol. 4, No. 1, 1996.

*Primary Examiner*—Eddie P Chan
*Assistant Examiner*—Corey S Faherty
(74) *Attorney, Agent, or Firm*—Blakely, Sokoloff, Taylor & Zafman LLP

(57) ABSTRACT

A row decoding circuit (171) outputs a select signal to a row set in a row range setting unit (172) to select a select signal line (103), processing results from processing circuits (102) on this row are output to a data output line (104), and a row adder (106) adds processing results output to a data output line (104) of a column set in a column range selector (105).

6 Claims, 18 Drawing Sheets

U.S. PATENT DOCUMENTS

| | | | |
|---|---|---|---|
| 5,771,189 A * | 6/1998 | Jun et al. | 365/149 |
| 5,790,702 A * | 8/1998 | Yoshimura | 382/209 |
| 6,075,876 A | 6/2000 | Draganoff | |
| 6,728,862 B1 * | 4/2004 | Wilson | 712/14 |
| 6,735,684 B1 * | 5/2004 | Shigematsu et al. | 712/10 |
| 7,085,796 B1 * | 8/2006 | Kosonocky | 708/700 |
| 7,199,897 B2 * | 4/2007 | Nomizu | 358/1.18 |

FOREIGN PATENT DOCUMENTS

| | | |
|---|---|---|
| JP | 2001-084370 A | 3/2001 |
| JP | 2001-242771 A | 9/2001 |

* cited by examiner

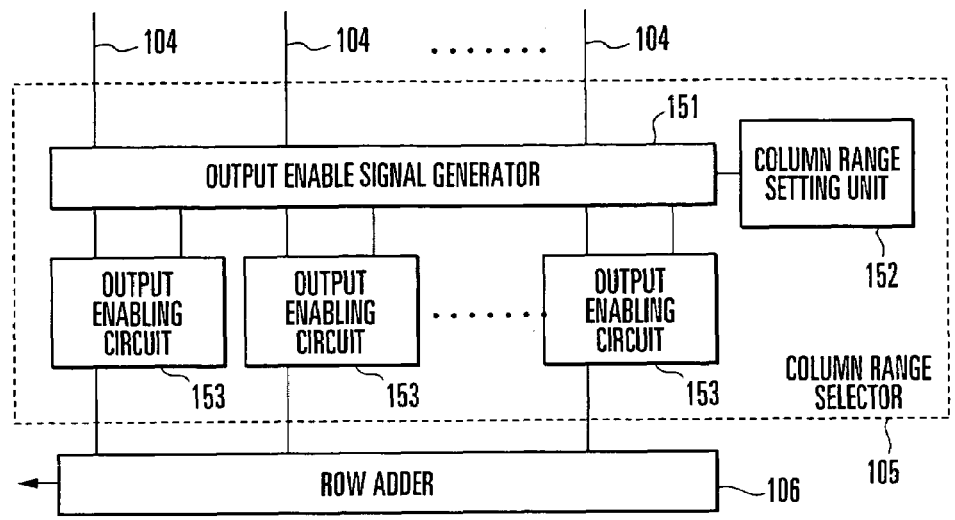
FIG. 4
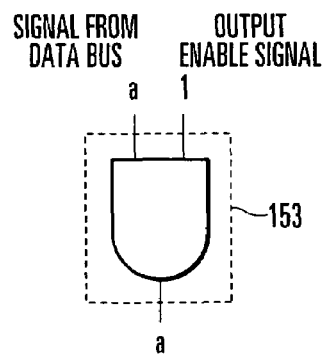 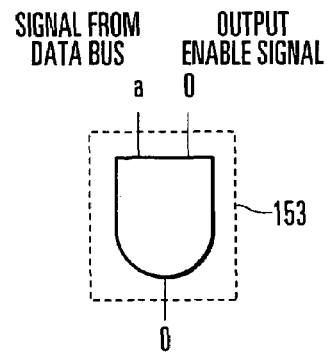
FIG.5A   FIG.5B

--Prior Art--

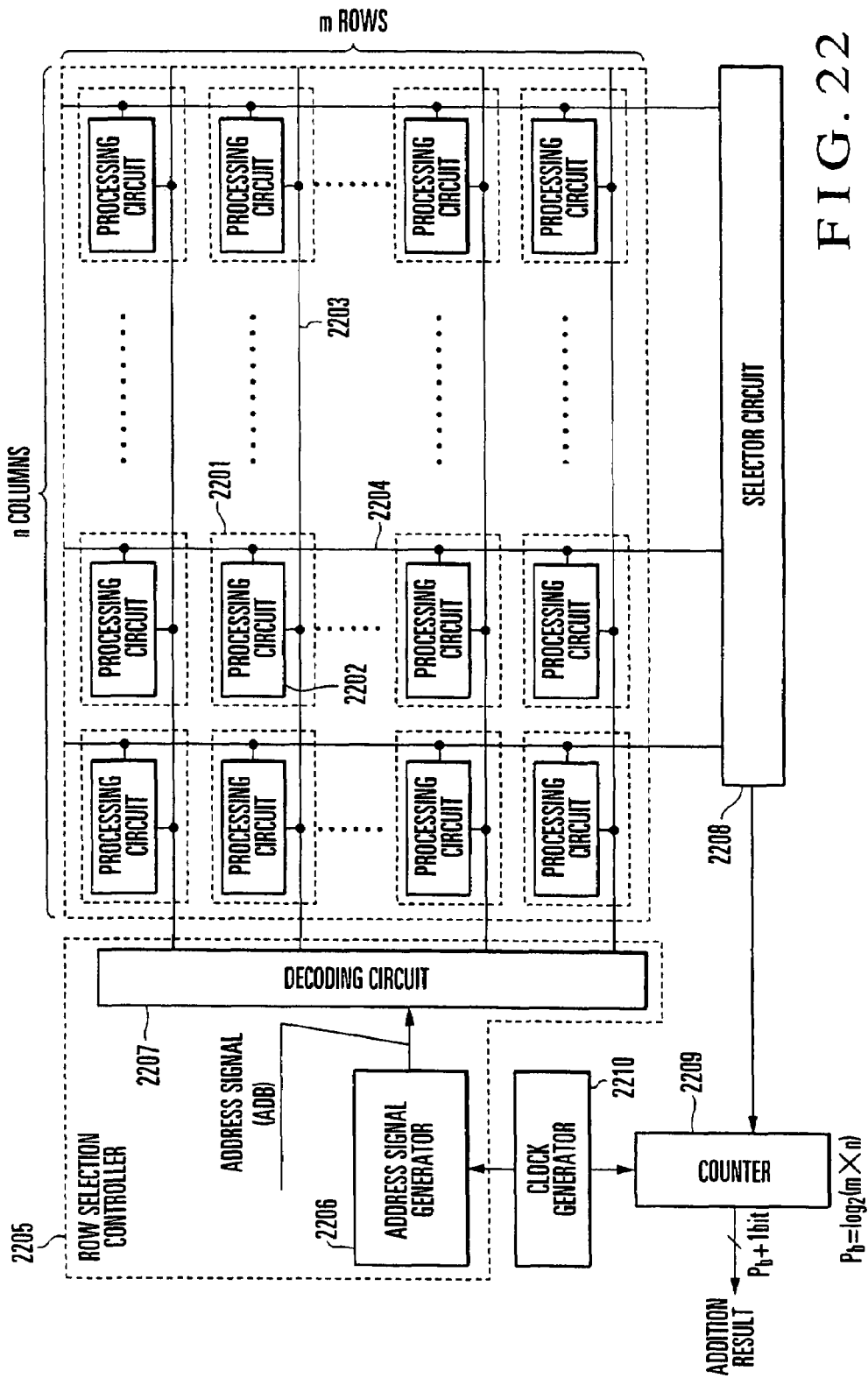
FIG. 22 --Prior Art--

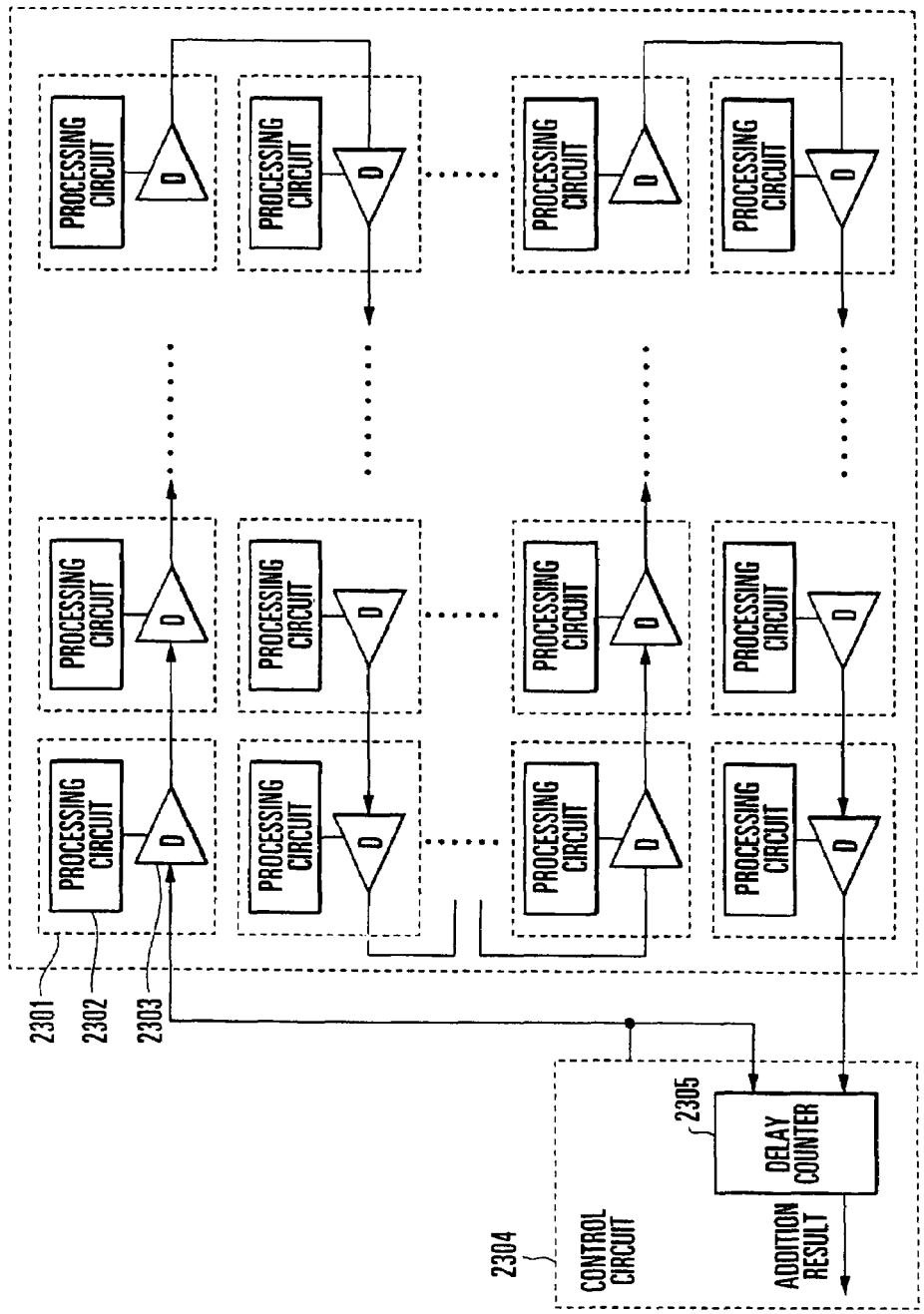
FIG. 23 --Prior Art--

PARALLEL PROCESSING DEVICE AND PARALLEL PROCESSING METHOD

The present patent application is a non-provisional application of International Application No. PCT/JP2004/001526, filed Feb. 13, 2004.

TECHNICAL FIELD

The present invention relates to a parallel processing apparatus for performing parallel processing by totalizing a plurality of processing results obtained by processors of a plurality of cells arranged in a matrix and, more particularly, to a parallel processing apparatus and parallel processing method of rapidly and accurately totalizing totalization results.

BACKGROUND ART

To perform high-speed information processing, parallel processing apparatuses which simplify individual processes and perform these simplified processes in parallel have been developed. An example is a parallel processing apparatus in which cells each for performing simple processing are arranged in a matrix to form a cell array, and these cells in this cell array are operated in parallel. An application example of this parallel processing apparatus is a processing apparatus (Japanese Patent Laid-Open No. 2001-242771) which includes a fingerprint sensor and fingerprint verification circuit in each cell, and determines whether a fingerprint obtained by the fingerprint sensors by operating all cells in parallel matches a registered fingerprint. Another application example is an apparatus (J. C. Gealow et al., "System Design for Pixel-Parallel Image Processing", IEEE Transaction on very large scale integration systems, vol. 4, no. 1, 1996) in which each cell has an image processing circuit, and which performs various image processing operations for an image acquired by an optical sensor or the like by operating all the cells in parallel.

The parallel processing apparatus having the cell array as described above will be briefly explained below. In this parallel processing apparatus as shown in FIG. 21, a plurality of cells each having a processing circuit are arranged in a matrix, and perform parallel processing on the basis of data and instructions given from a control circuit. When this parallel processing performed by these cells is completed, the control circuit totalizes processing results output from the processing circuits of the cells to generate and output a total processing result.

When the apparatus includes a large number of cells, the processing circuit in each cell is simplified, and the processing result obtained by the processing circuit in each cell is data of true or false, or data of about a few bits.

An application example in which a parallel processing apparatus having a cell array is often used is image processing. When parallel processing is applied to image processing, each cell performs predetermined processing for a few dots forming an image to be processed. For example, when image processing such as pattern matching is to be performed, each cell performs image processing for dots in an image assigned to the cell, and outputs true, false, or the like as a matching result. When parallel processing of each processing is completed, a control circuit counts and totalizes the number of true outputs, calculates the matching ratio or the like of the image on the basis of the totalized number of true outputs, and generates a pattern matching processing result.

As described above, in a parallel processing apparatus in which a larger number of processing circuits separately disperse, processing results obtained by these processing circuits must be collected. In parallel processing, therefore, if the collecting process such as the totalization of true or false is not fast, the effect of increasing the operation speed by the parallel processing is lost.

The parallel processing apparatus totalization process of collecting processed data includes a first method by which processing results are read out from individual cells and totalized in the same manner as in a DRAM (Dynamic Random Access Memory) or the like. A second method (Japanese Patent Laid-Open No. 2001-166917) is also proposed in which cells each having a variable delay time circuit are connected in series, and delay times of these variable delay circuits during which processing results are output are collectively measured, thereby rapidly totalizing the processing results.

First, the first method of reading out processing results from individual cells and totalizing the readout results in the same manner as in a DRAM or the like will be described below. As shown in FIG. 22, this method uses a plurality of cells 2201 arranged into n rows×m columns. The input of a processing circuit 2202 of each cell 2201 is connected to a select signal line 2203, and the output of each cell 2201 is connected to a data bus 2204. The select signal line 2203 is connected to each row of the arrayed processing circuits 2202, and the data bus 2204 is connected to each column of the arrayed processing circuits 2202.

An address signal generator 2206 in a row selection controller 2205 generates an address signal for sequentially designating different rows one by one, in synchronism with an output clock signal from a clock generator 2210. The address signal thus generated is transmitted to a predetermined select signal line 2203 via a decoding circuit 2207 to select cells in a row corresponding to the select signal line 2203 to which the address signal is transmitted. In this selected row, each processing circuit 2202 outputs a processing result (true or false), and this processing result is input to a selector circuit 2208 via the data bus 2204. Accordingly, processing results are output from a plurality of processing circuits 2202 for each row in synchronism with the row clock signal described above.

The processing results thus output from the processing circuits 2202 are transmitted to the selector circuit 2208 by the data bus 2204. The selector circuit 2208 accepts a plurality of processing results from each row by the data bus 2204, and transmits the accepted processing results to a counter 2209 for each row. The counter 2209 counts the thus transmitted processing results from the processing circuits 2202. The counter 2209 totalizes the processing results (e.g., true) from the processing circuits 2202, and outputs the addition result of these processing results.

As a consequence, the counter 2209 obtains the total of the output processing results (e.g., the number of true outputs) from the processing circuits 2202.

For example, if the arrangement shown in FIG. 22 is so designed that the processing circuit 2202 outputs true when a prerecorded reference pattern matches a detected pattern, a surface (fingerprint) shape detected in the region where the cells 2201 are arranged can be verified. In this case, if the number of cells from which true is output exceeds 80% of all the cells, it is possible to determine (verify) that the detected fingerprint shape matches the prerecorded fingerprint shape. Note that the fingerprint data is the total of the reference patterns of all the cells.

The second method mentioned earlier will be described below. As shown in FIG. 23, each cell 2301 includes a processing circuit 2302 and a variable delay circuit 2303 which changes the passing time of progression in accordance with a processing result from the processing circuit 2302. A plurality of cells 2301 are connected in series via the variable delay circuits 2303. The variable delay circuit 2303 is made up of inverter circuits different in driving force, and an output result (true or false) from the processing circuit 2302 of each cell 2301 is reflected on the signal propagation time of the delay circuit 2303.

When a control circuit 2304 transmits a measurement input signal to the cells 2301 thus connected in series, the transmitted measurement input signal is first input to the variable delay circuit 2303 of the first cell 2301, passes through the variable delay circuits 2303 of the cells 2301, passes through the variable delay circuit 2303 of the last cell 2301, and enters a delay counter 2305 as a measurement output signal.

Assume that the variable delay circuit 2303 gives a predetermined additional delay to the fundamental delay of a passing signal if the processing result from the processing circuit 2302 is true. Accordingly, the measurement output signal passing through all the cells 2301 is input to the delay counter 2305 after being delayed from a fundamental delay time obtained by multiplying the fundamental delay time by the number of all cells, by an additional delay time obtained by multiplying the additional delay by "the number of cells 2301 (the number of true cells) whose processing circuits 2302 output true". On the other hand, the measurement input signal output from the control circuit 2304 is also output to the delay counter 2305 without passing through the cells 2301.

The delay counter 2305 calculates a difference between the input time of the measurement input signal which is directly input and the input time of the measurement output signal passing through the last cell 2301, and counts the number of true cells 2301 on the basis of this time difference.

The time at which the measurement output signal is input to the delay counter 2305 is delayed from the output time of the measurement input signal by the fundamental delay×the number of cells+the additional delay×the number of true cells, so this delay is measured. Since the fundamental delay, the additional delay, and the number of cells are already known, the number of true cells can be calculated by subtracting the fundamental delay×the number of cells from the measured delay, and dividing this value by the additional delay.

For example, if the arrangement shown in FIG. 23 is so designed that the processing circuit 2302 outputs true when a prerecorded reference pattern matches a detected pattern, a surface (fingerprint) shape detected in the region where the cells 2301 are arranged can be verified. In this case, if the number of cells from which true is output exceeds 80% of all the cells, it is possible to determine (verify) that the detected fingerprint shape matches the prerecorded fingerprint shape. Note that the fingerprint data is the total of the reference patterns of all the cells.

In the first conventional method described previously, however, the processing results from the cells are transferred row by row to the counter, but the counter totalizes the processing results cell by cell. In the first conventional method, therefore, if the number of arrays increases to increase the number of cells, the time required for the totalization prolongs accordingly. For example, when the first method is applied to an apparatus for verifying fingerprints as described above, if the number of cells is increased to raise the accuracy, the time required to totalize true cells prolongs, and this extends the time required for the verification process, and deteriorates the convenience.

Also, in the second method described above, the differences between signal propagation of the inverter circuits different in driving force are used as the variable delay circuits. This makes it difficult to ensure accuracy, and produces an error in the totalization result. For example, when the second method shown in FIG. 23 is applied to an apparatus for performing fingerprint verification, the verification is performed using the number of true cells. If an error occurs in the totalization result, therefore, the verification ratio lowers, and this makes it impossible to assure high security.

Furthermore, in either method described above, totalization cannot be performed for arbitrary ones of a plurality of arrayed cells. Accordingly, when the above conventional techniques are applied to, e.g., fingerprint verification, any portion of a detected fingerprint cannot be compared.

The present invention has been made to solve the above problems, and has as its object to make it possible to totalize processing results from a plurality of cells processed in parallel more rapidly and accurately than in the conventional apparatuses, and to totalize processing results from arbitrary cells.

DISCLOSURE OF INVENTION

A parallel processing apparatus according to the present invention comprises at least a plurality of cells arrayed in a matrix, a plurality of select signal lines formed in one-to-one correspondence with rows of the array, row range setting means for selecting one of the select signal lines in accordance with a set row range, row address signal generating means for outputting, at a predetermined interval, an address signal for selecting a select signal line selected by the row range setting means, row decoding means for outputting a select signal to a select signal line designated by the address signal output from the row address signal generating means, a processor which is formed in each cell, connects to the select signal line for each row of the array, performs predetermined processing, and outputs a result of the processing when the select signal is input via the select signal line, a data output line which is formed for each column of the array, connects to the processors in each column, and propagates results of the processing output from the processors, column range selecting means for selecting one of the data output lines in accordance with a set column range, row adding means for adding, for each row of the array, processing results output to a data output line selected by the column range selecting means, and outputting a row addition result, and accumulation adding means for adding, in synchronism with the predetermined interval, row addition results of individual rows output from the row adding means, and outputting an addition result as a totalization result.

In this apparatus, processing results of the processors of the cells arrayed in a matrix are not added cell by cell at a predetermined interval but added row by row of the array at a predetermined interval, and these row addition results are added in synchronism with the predetermined interval, thereby totalizing the processing results of the processors. In addition, of the arrayed cells, processing results of the processors in a set row range and column range are totalized.

Also, a parallel processing method according to the present invention comprises at least the first step of allowing processors formed in a plurality of cells arrayed in a matrix to perform predetermined processing, the second step of selecting one of a plurality of select signal lines formed in one-to-one correspondence with rows of the array, in accordance with a set row range, the third step of generating an address signal for selecting a selected select signal line, the fourth step of outputting a select signal to a select signal line designated by the generated address signal, the fifth step of outputting results of the processing from a plurality of the processors connected to the select signal line to which the select signal is output, to a plurality of data output lines formed in one-to-one correspondence with columns of the array, and the sixth step of selecting one of the data output lines in accordance with a set column range, adding processing results output to the selected data output line, and outputting a row addition result, wherein the second to sixth steps are repeated for each row of the array, and the row addition results obtained from the individual rows are added.

In this method, processing results of the processors of the cells arrayed in a matrix are not added cell by cell at a predetermined interval but added row by row of the array at a predetermined interval, and these row addition results are added in synchronism with a predetermined interval, thereby totalizing the processing results of all the processors. In addition, of the arrayed cells, processing results of the processors in a set row range and column range are totalized.

BRIEF DESCRIPTION OF DRAWINGS

FIG. 4 is a view showing an example of the arrangement of a column range selector 105 shown in FIG. 1;

FIG. 5A is a circuit diagram showing an example of the arrangement of an output enabling circuit 153 shown in FIG. 4;

FIG. 5B is a circuit diagram showing an example of the arrangement of the output enabling circuit 153 shown in FIG. 4;

FIG. 22 is a view showing the arrangement of a conventional parallel processing apparatus made up of cells arranged in a matrix; and FIG. 23 is a view showing the arrangement of a conventional parallel processing apparatus.

BEST MODE FOR CARRYING OUT THE INVENTION

Embodiments of the present invention will be described below with reference to the accompanying drawings.

FIRST EMBODIMENT

Figure 1:
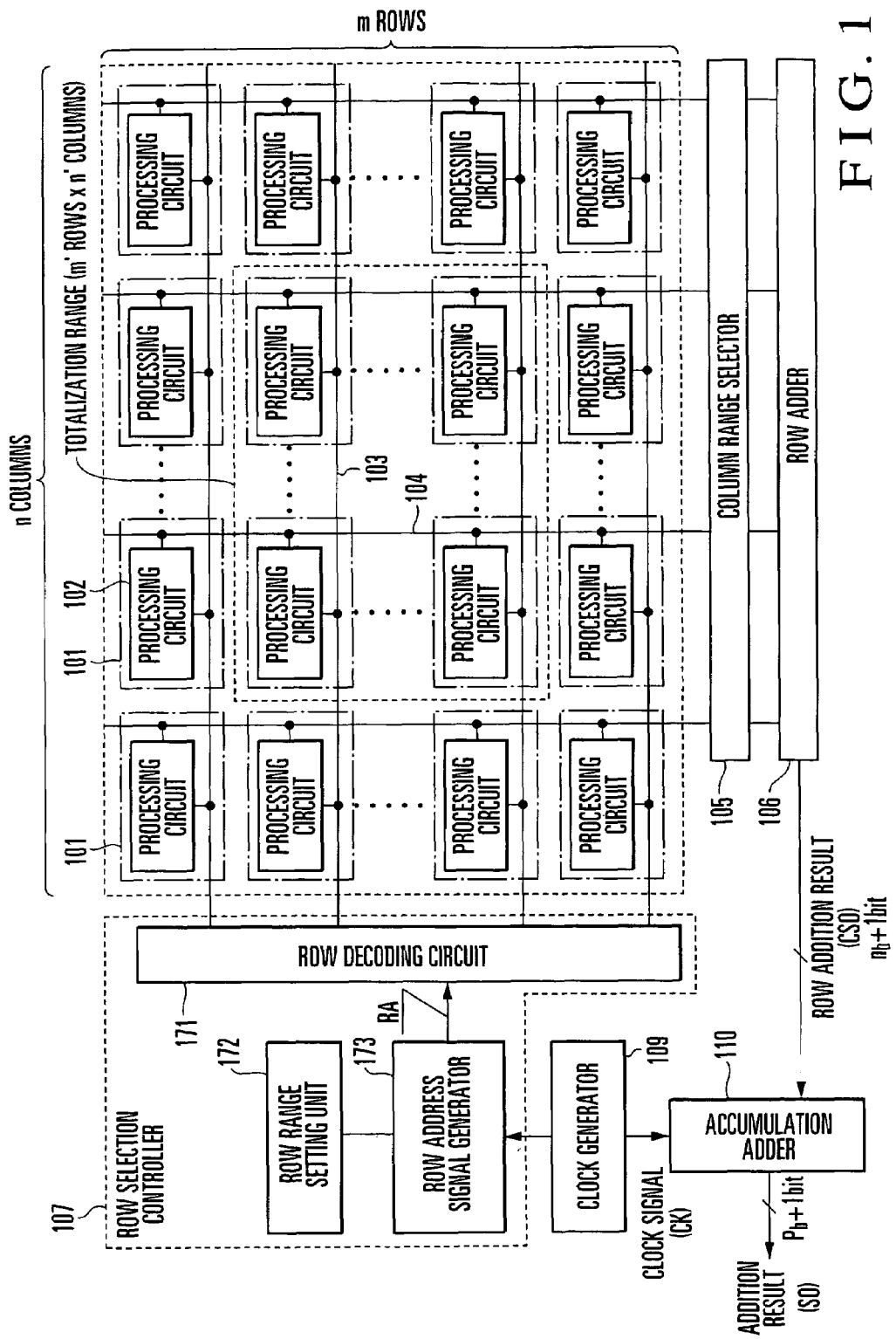
FIG. 1 is a view showing an example of the arrangement of a parallel processing apparatus according to an embodiment of the present invention.

FIG. 1 is a view showing an example of the arrangement of a parallel processing apparatus according to the first embodiment of the present invention. This parallel processing apparatus is made up of cells 101 arranged into m rows×n columns, a column range selector 105, a row adder 106, a row selection controller 107, and an accumulation adder 110. Each cell 101 has a processing circuit 102 for performing predetermined processing. The row selection controller 107 has a row decoding circuit 171 connecting to select signal lines 103, a row range setting unit 172, and a row address signal generator 173. The input and output of each processing circuit 102 are connected to the select signal line 103 and a data bus (data output line) 104, respectively.

The select signal line 103 corresponding to each row is connected to the row decoding circuit 171 of the row selection controller 107. The data bus 104 corresponding to each column is connected to the row adder 106 via the column range selector 105.

Figure 2:
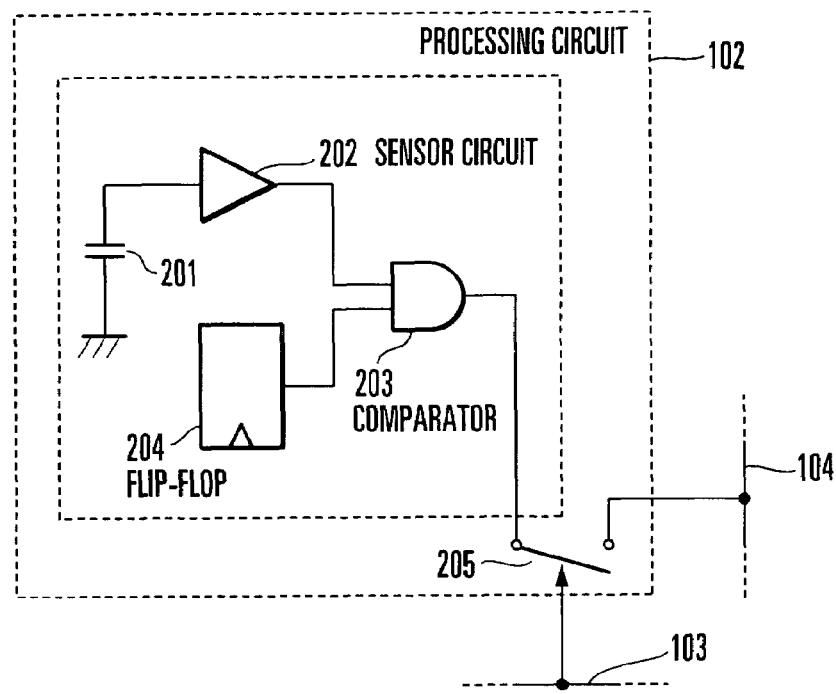
FIG. 2 is a circuit diagram showing an example of the arrangement of a processing circuit 102 shown in FIG. 1.

An example of the processing circuit 102 will be explained below. As shown in FIG. 2, the processing circuit 102 includes a sensor element 201 for sensing a capacitance, a sensor circuit 202 for converting the capacitance sensed by the sensor element 201 into an electrical signal and outputting digital data, a flip-flop 204 for storing data of one cell (pixel) of a registered shape (image), and a comparator 203 for comparing the outputs from the sensor circuit 202 and flip-flop, and outputting "true" if the two outputs are the same and "false" if not. Portions sensed by the sensor elements 201 and registered portion data stored in the flip-flops 204 are compared in parallel cell by cell, and the comparison results are output to the data buses 104 via switching elements 205 controlled by a select signal. It is possible to obtain, e.g., the matching of a fingerprint shape by totalizing the processing results described above obtained from the cells 101.

As shown in FIG. 1, the plurality of cells 101 are arranged in a matrix, so the sensor elements 201 are also arranged in a matrix. Accordingly, a two-dimensional sensor is formed by these components. The sensor element 201 is a square capacitance type sensor element of, e.g., about 50 μm side. The parallel processing apparatus shown in FIG. 1 is a fingerprint verification apparatus having a sensing surface on which the plurality of sensor elements 201 are arranged in a matrix.

In a surface shape recognition sensor having a sensing surface made up of a plurality of capacitance type sensor elements arranged in a matrix, a capacitance is formed between each portion of the surface (fingerprint) of a finger in contact with the sensing surface and each sensor element, and this capacitance formed is sensed by the sensor element. The capacitance sensed by each sensor element changes in accordance with the pattern of the fingerprint, and the capacitances corresponding to the pattern are sensed in accordance with the arrangement of the sensor elements. Therefore, the fingerprint shape can be reproduced by forming continuous tone data in accordance with the capacitances sensed in the positions of these sensor elements.

The value sensed by each sensor element is compared with the registered value for each cell in which the sensor element is placed. By totalizing these comparison results, the fingerprint (shape) sensed by the sensing surface can be verified.

Accordingly, a one-chip fingerprint verification apparatus can be obtained by the apparatus shown in FIGS. 1 and 2. Also, in this apparatus, each cell need not be given an adding function. This makes it possible to suppress an increase in size, and increase the number of cells (sensor elements) within a predetermined area.

Totalization in the range of m' rows×n' columns (a rectangular region indicated by the dotted lines in FIG. 1) of the plurality of cells arranged into m rows×n columns will be explained below.

Figure 3:
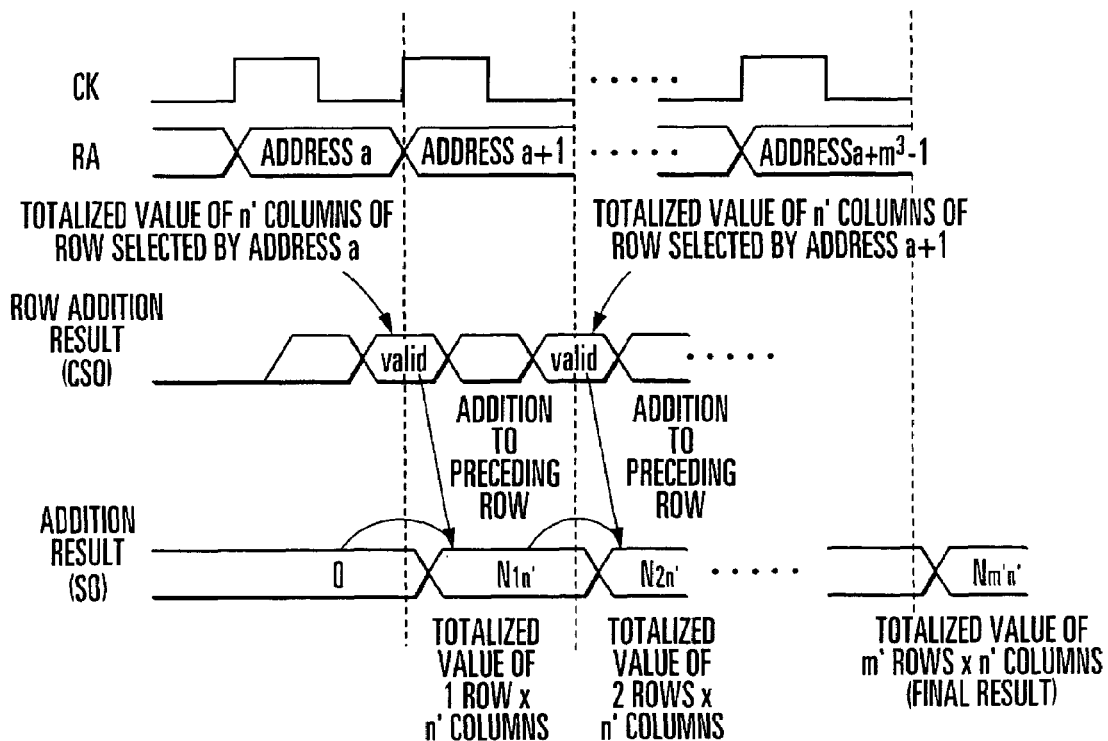
FIG. 3 is a timing chart showing an example of the operation of the parallel processing apparatus shown in FIG. 1.

By a row address signal (RA) output from the row address signal generator 173 in the row selection controller 107, a select signal transmitted to the select signal line 103 is As shown in FIG. 3, in synchronism with a clock signal (CK) output from a clock generator 109, the row address signal generator 173 selectively generates and outputs a row address signal (RA) for selecting a row of the cells 101, within the range set in the row range setting unit 172. The output row address signal (RA) is input to the row decoding circuit 171. Upon receiving the row address signal (RA), the row decoding circuit 171 outputs a select signal to a row designated by this row address signal.

Accordingly, the select signal lines 103 outside the range set in the row range setting unit 172 are not selected. In this embodiment, the select signal lines 103 outside the totalization range indicated by the dotted lines are not selected.

In the row of the select signal line 103 to which the select signal is output as described above, the processing circuit 102 of each cell 101 outputs a processing result to the connected data bus 104. This processing result is a signal corresponding to true or false.

In this manner, the processing results from the processing circuits 102 on the first row, the processing results from the processing circuits 102 on the second row, . . . , are output row by row in synchronism with the clock signal (CK) to the row adder 106 via the column range selector 105. The column range selector 105 outputs the values of data buses corresponding to preset selected columns. The row adder 106 connected to the data buses 104 accepts, via the data buses 104, the processing results from the cells 101 on the same row and in columns selected by the column range selector 105, adds the accepted results, and outputs the addition result to the accumulation adder 110. Therefore, as shown in FIG. 3, the row adder 106 outputs the addition result of each row (row addition result: CSO) in synchronism with the clock signal (CK).

Also, as shown in FIG. 3, in synchronism with the clock signal (CK), the accumulation adder 110 adds the row addition results output from the row adder 106 in synchronism with the clock signal (CK). When the row address signal generator 173 generates a row address signal (RA) for selecting the last row, the accumulation adder 110 outputs the totalization result (final result) of the processing results output from the processing circuits 102 of the cells 101 within the set range (m' rows×n' columns).

An example of the operation will be described below with reference to FIG. 3. Assume that the row range setting unit 172 is so set as to select m' rows from a row at an address a, and the column range selector 105 is so set as to select n' columns from a column at an address b. In synchronism with the output clock signal from the clock generator 109, the row address signal (RA) is changed, and the select signal lines 103 (rows) are selected from the row address a.

When the processing time of the row adder 106 has elapsed after the row address is changed, a row addition result (CSO) is determined. The column range selector 105 selects n' columns from the column at the address b, and outputs only outputs from the selected columns to the row adder 106. Accordingly, the row adder 106 outputs addition results only within the range of the n' columns from the column at the address b.

The accumulation adder 110 adds the row addition result (CSO) when the row address is changed, to the addition result (SO) before the row address is changed. By performing the above processing to a row address a+m'−1, the totalization result within the range of m' rows×n' columns is determined.

Note that in the row range setting unit 172, it is also possible to set the start address of the row address signal generator 173 and the row range m', or the end address and row range m'. The row range setting unit 172 can be constructed by a register circuit for holding a set value indicating the above range. Also, the row address signal generator 173 can be constructed by a logic circuit and counter circuit.

In this embodiment as described above, the output processing results from the processing circuits 102 of the arrayed cells 101 are added row by row in synchronism with the clock signal, and the row addition results are further added. Consequently, the processing time can be reduced to 1/(the number of cells in each row), i.e., 1/(the number of columns), compared to the conventional apparatus in which processing results are added cell by cell in synchronism with a clock signal. Also, the processing is performed using only digital signals, so the totalization process can be performed without producing any error in the totalization result.

Furthermore, cells within an arbitrary (predetermined) range can be selected and totalized. In the above embodiment, totalization within the range of m' rows×n' columns is explained as an example, but the present invention is not limited to this example. It is also possible to totalize a plurality of divided ranges by setting the row range setting unit 172 and column range selector 105.

SECOND EMBODIMENT

The column range selector 105 will be explained in more detail below. FIG. 4 is a view showing an example of the arrangement of the column range selector 105 in the parallel processing circuit shown in FIG. 1. The column range selector 105 shown in FIG. 4 is characterized by comprising an output enable signal generator 151, a column range setting unit 152, and output enabling circuits 153 formed in one-to-one correspondence with the data buses 104.

The output enabling circuit 153 controls an output signal from the data bus 104, in accordance with an output enable signal from the output enable signal generator 151. If the output enable signal is "enable", the signal from the data bus 104 is directly output. If the output enable signal is "disable", "0" (zero) is output. In this way, only processing results from the processing circuits 102 of the cells 101 within the designated totalization range (column range) can be added without changing the arrangement of the row adder 106.

In accordance with the totalization range set in the column range setting unit 152, the output enable signal generator 151 outputs an output enable signal indicating "enable" or "disable" to the output enabling circuit 153. FIGS. 5A and 5B illustrate examples of the output enabling circuit 153. As shown in FIGS. 5A and 5B, the output enabling circuit 153 can be realized by using an AND gate. FIG. 5A shows the state in which outputting is enabled, and FIG. 5B shows the state in which outputting is disabled. When the output enable signal is "1" as shown in FIG. 5A, a signal "a" from the data bus is output. When the output enable signal is "0" as shown in FIG. 5B, a signal "0" is output without outputting the signal "a" from the data bus.

The column range setting unit 152 can be constructed by a register circuit for holding the set value of the column range described above. The output enable signal generator 151 need only be so constructed that only the output enabling circuits 153 in a column corresponding to the set value in the column range setting unit 152 output "1".

By the use of the column range selector 105 shown in FIG. 4, the values of only the data buses 104 within the column range set in the column range setting unit 152 are output to the row adder 106, and the other columns output "0". As a consequence, only data of cells in the designated column can be added without changing the arrangement of the row adder 106.

THIRD EMBODIMENT

Figure 6:
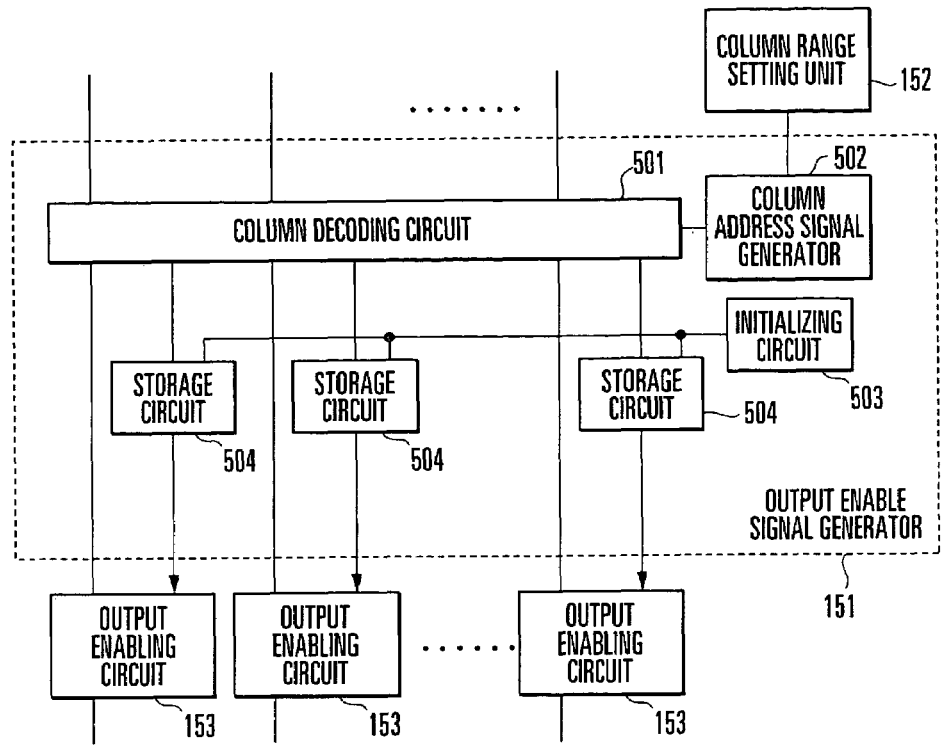
FIG. 6 is a view showing an example of the arrangement of an output enable signal generator 151 shown in FIG. 4.

The output enable signal generator will be described in more detail below. FIG. 6 is a view showing an example of the arrangement of the output enable signal generator 151 in the column range selector 105 shown in FIG. 4. The output enable signal generator 151 shown in FIG. 6 is characterized by comprising a column decoding circuit 501, a column address signal generator 502, an initializing circuit 503, and a plurality of storage circuits 504 corresponding to the output enabling circuits 153.

Each storage circuit 504 holds an output enable signal to be output to the output enabling circuit 153. This output enable signal can be set in the storage circuit 504 as follows. First, the storage circuits 504 are initialized by the initializing circuit 503. After that, by selecting columns to be enabled to output data, an output enable signal is set in the corresponding storage circuits 504. Rows to be enabled to output data are set in the column range setting unit 152, and the row address signal generator 502 outputs row addresses corresponding to the set values. In accordance with the output row addresses, the column decoding circuit 501 sets an output enable signal for output enable control in the storage circuits 504.

Figure 7:
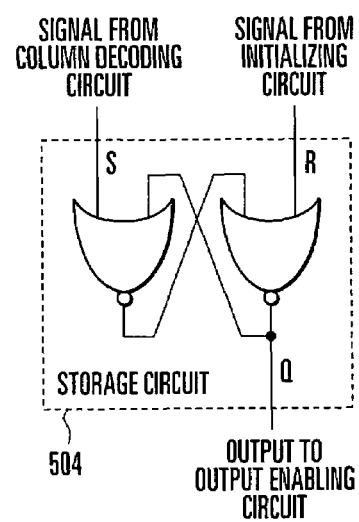
FIG. 7 is a circuit diagram showing an example of the arrangement of a storage circuit 504 shown in FIG. 6.

FIG. 7 shows an example of the arrangement of the storage circuit 504. As shown in FIG. 7, the storage circuit 504 can be constructed by an SR flip-flop. When "1" is input to the reset terminal (R), "0" is written in the SR flip-flop, and "0" is output from the output (Q). When "1" is input to the set terminal (S), "1" is written, and "1" is output from the output (Q).

When the storage circuit 504 having the above arrangement is used, by writing "1" in the storage circuit 504 selected by the column decoding circuit 501, a predetermined output enable signal can be set in the corresponding output enabling circuit 153.

In the above embodiment, an output enable signal "1" as a signal for specifying a column is set in the output enabling circuit 153 of a column to be enabled to output data, but the present invention is not limited to this embodiment. For example, it is also possible to enable all columns to output data upon initialization, and set a predetermined output enable signal only in output enabling circuits corresponding to columns to be disabled to output data. The state of an output enable signal to be set in the storage circuits 504 corresponding to selected columns need only be different from the state of an output enable signal to be set in the other storage circuits, in accordance with the set state in the column range setting unit 152.

In the parallel processing apparatus of this embodiment described above, a column decoding circuit capable of forming a regular layout is used, and storage circuits are formed in one-to-one correspondence with columns. Since this makes a regular layout feasible, an output enable signal generator having a small area can be simply realized.

FOURTH EMBODIMENT

Figure 8:
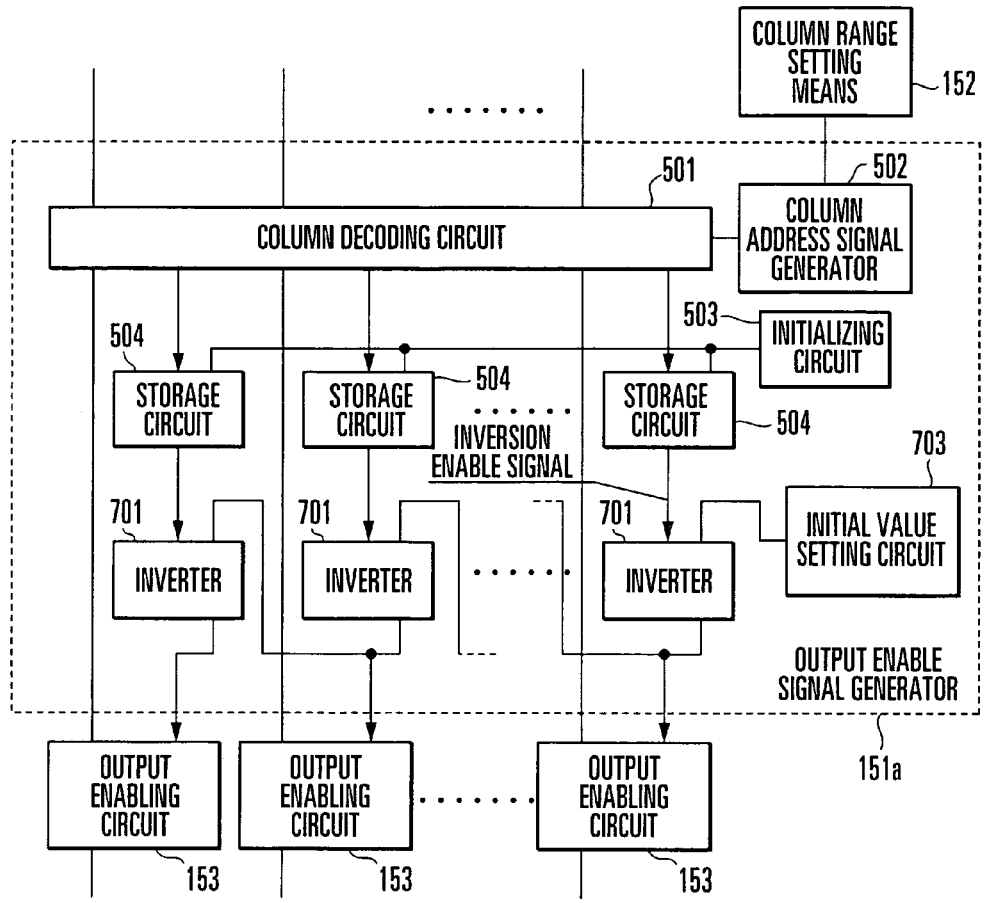
FIG. 8 is a view showing another example of the arrangement of the output enable signal generator.

An output enable signal generator of another embodiment will be described below with reference to FIG. 8. An output enable signal generator 151a shown in FIG. 8 is obtained by adding inverters 701 and initial value setting circuits 703 to the output enable signal generator 151 shown in FIG. 6. The inverter 701 inverts an input signal and outputs the inverted signal if an inversion enable signal output from a storage circuit 504 is "enable", i.e., "1". Also, the inverter 701 outputs the same signal as an input signal if the inversion enable signal output from the storage circuit 504 is "disable", i.e., "0".

Figure 9:
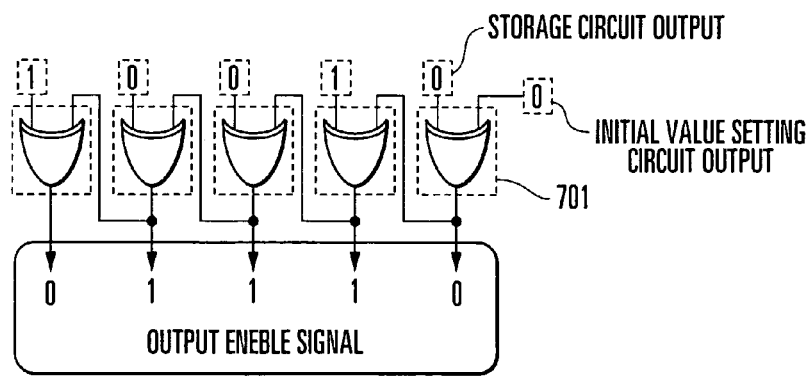
FIG. 9 is a circuit diagram showing an example of the arrangement of an inverting 701.

For example, the inverter 701 can be realized by an exclusive OR (EOR) gate as shown in FIG. 9. When an inversion enable signal is output from each storage circuit as shown in FIG. 9, an inversion enable signal of "enable", i.e., "1", need only be set in the inverters 701 corresponding to columns in which an output enable signal changes when continuous columns are compared. An inversion enable signal of "disable", i.e., "0", is set in the inverters 701 corresponding to other columns.

This eliminates the need to set "1" in storage circuits of all columns to be enabled to output data.

To select the range of, e.g., n' columns, therefore, "1" need only be set in two storage circuits corresponding to columns in the boundary regions of this range, so the number of times of setting can be reduced to 2/n' when compared to the example shown in FIG. 6. In this embodiment as described above, the state of an inversion enable signal to be set in storage circuits corresponding to selected columns is made different from that of an inversion enable signal to be set in other storage circuits, in accordance with the state set in a column range setting unit 152. This makes it possible to simplify the procedure of setting the selection range of the output enable signal generator.

The initial value setting circuit 703 can be realized by a flip-flop or the like, and, if the polarity of a signal is predetermined, the initial value setting circuit 703 may also be shortcircuited to a potential corresponding to "0" or "1", i.e., the ground potential or power supply potential. In the above embodiment, the signal polarity is not limited.

Figure 10:
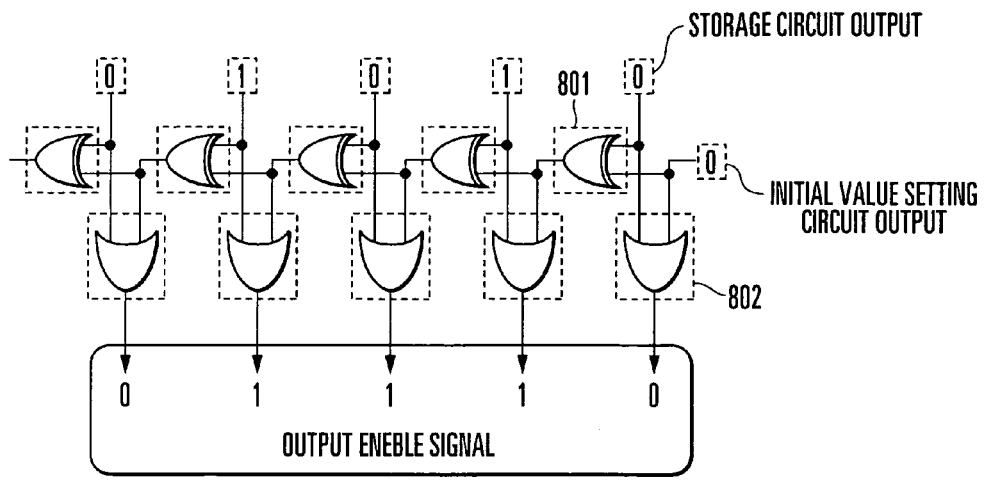
FIG. 10 is a circuit diagram showing an example of the arrangement of a portion of the output enable signal generator.

Also, as shown in FIG. 10, it is possible to form logic circuits 802 in addition to inverters 801, and output the results of logical operations performed on inversion enable signals and inverted signals by the logic circuits 802 to the output enabling circuits as output enable signals. With this arrangement, the set range of column addresses and the designated range of the column decoding circuit can be matched, so the convenience improves. The logic circuit 802 is not limited to an OR gate, but may also have another circuit configuration.

Figure 11:
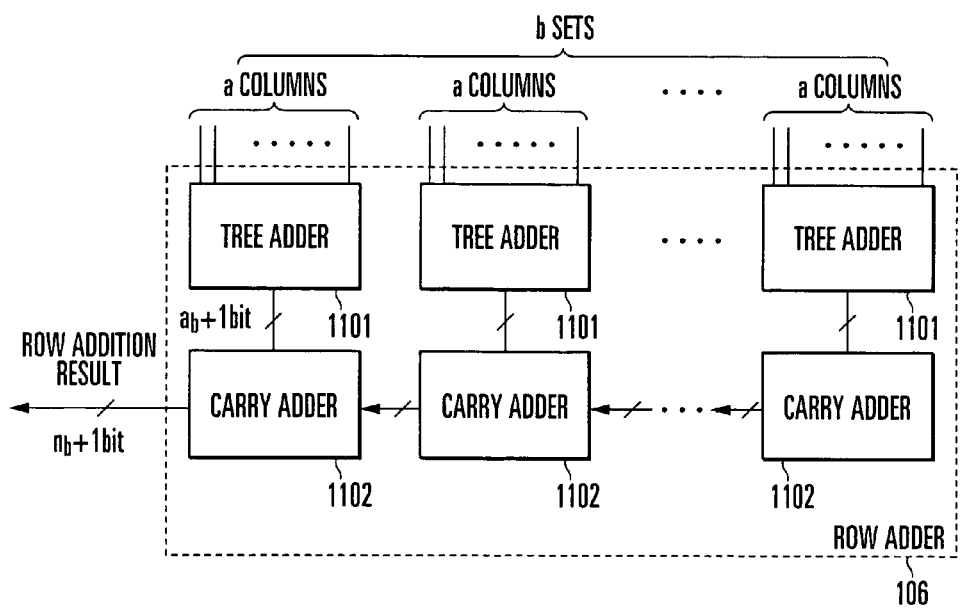
FIG. 11 is a view showing an example of the arrangement of a row adder 106 shown in FIG. 1.

The row adder will be described in more detail below. FIG. 11 is a view showing an example of the arrangement of the row adder in the parallel processing circuit shown in FIG. 1. A row adder 106 shown in FIG. 11 is characterized by comprising tree adders 1101 and carry adders 1102. The row adder 106 adds 1-bit signals output to the data buses 104 to which the arrayed cells 101 are connected.

When the number of columns of the arrayed cells 101 is n, the row adder 106 is required to have a function of adding n binary bits and outputting the result of $n_b+1$ (=$\log_2(n)+1$) bits.

Figure 12:
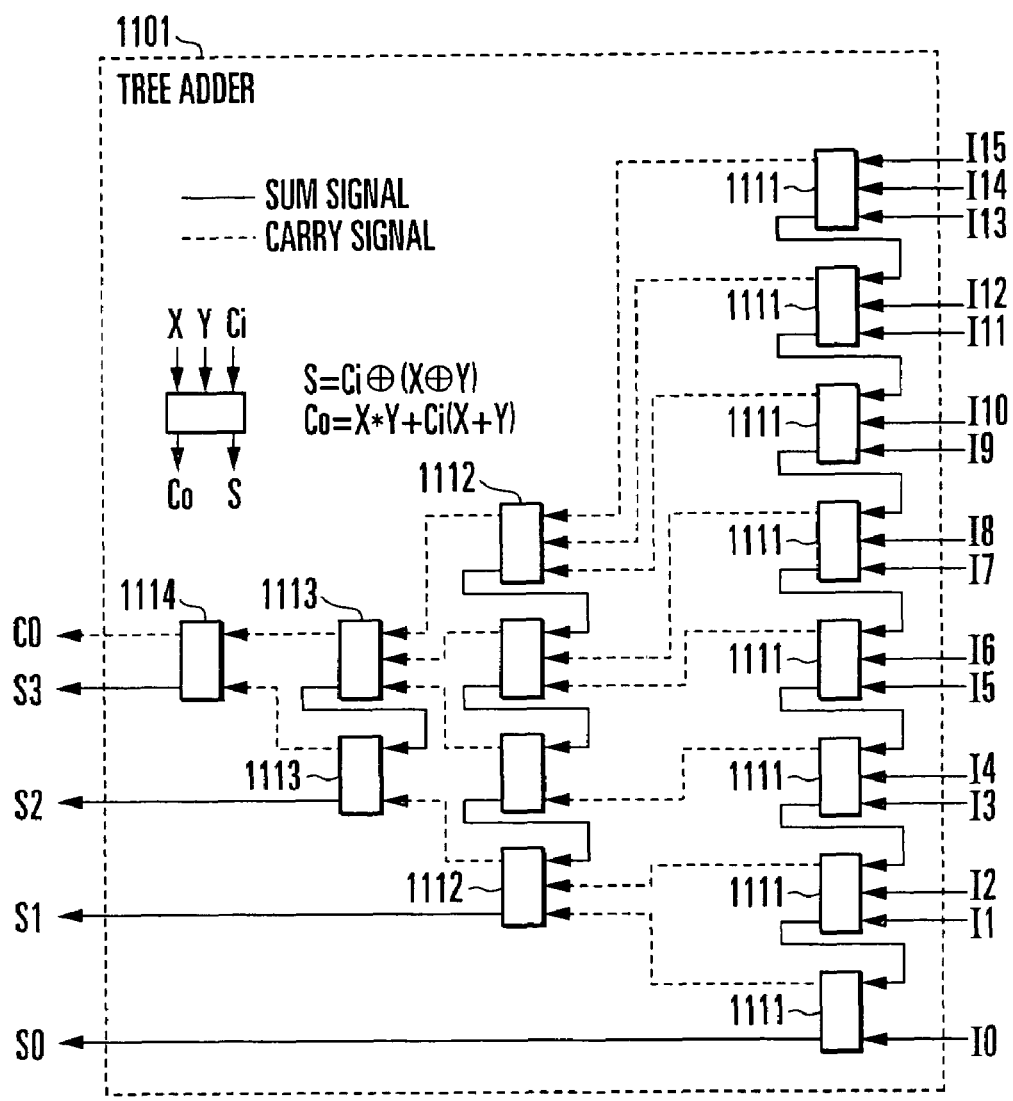
FIG. 12 is a view showing an example of the arrangement of a tree adder.

The tree adder 1101 satisfies this function. FIG. 12 is a view showing an example of the arrangement of the tree adder 1101 when n=16. The tree adder 1101 comprises eight full adders 1111 in the first input stage, four full adders 1112 in the second input stage, two full adders 1113 in the third input stage, and one full adder 1114 in the fourth input stage.

In the tree adder 1101, each bit of a 16-bit input signal from the input side is input to one of input terminals (X, Y, and Ci) of one of the eight full adders 1111. Sum signals (S) output from seven full adders 1111 of the eight full adders 1111 are input to the input terminals of the respective adjacent full adders 1111, and a sum signal (S) output from one remaining full adder 1111 is used as the least significant bit (S0) of an output signal from the tree adder 1101.

Carry signals ($C_o$) indicated by the dotted lines output from the eight full adders 1111 in the first stage are input to the input terminals of the four full adders 1112 in the second stage. The four full adders 1112 are connected in the same manner as the full adders 1111 in the first stage described above; sum signals (S) output from three full adders 1112 in the second stage are input to the input terminals of the adjacent full adders 1113 (in the third stage), and a sum signal (S) output from one remaining full adder 1112 is used as the second bit output (S1) of the output signal from the tree adder 1101.

In the tree adder 1101, the third stage is made up of the two full adders 1113, and the fourth stage is made up of the one full adder 1114, in order to add carry signals as described above. When n=16, the tree adder 1101 need only be made up of a total of 15 full adders, and outputs five bits (=$\log_2(16)+1$) with respect to a 16-bit input.

A tree adder has no regularity in the connection of full adders, so a designer must connect all lines. In the above description, the case in which n=16 is taken as an example. However, in a parallel processing apparatus used in image processing and the like, n is a few hundreds to a few thousands. Since this complicates the circuit of a tree adder corresponding to the apparatus, not only the designing time becomes enormous, but also the designer readily makes mistakes.

Figure 13:
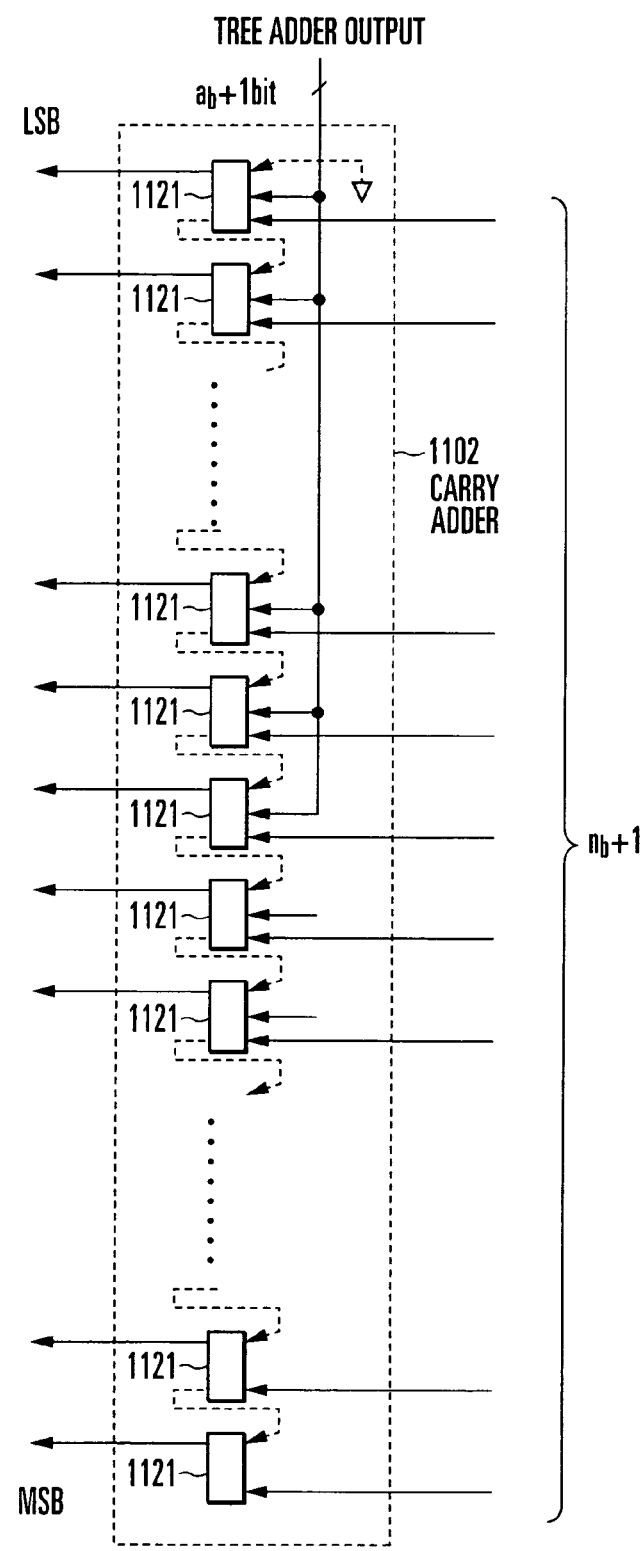
FIG. 13 is a view showing an example of the arrangement of a carry adder.

To solve this problem, as shown in FIG. 11, n data buses are divided into b sets each including a columns, and each set is provided with the tree adder 1101 having a-bit inputs and ($a_b+1$ (=$\log_2(a)+1$))-bit outputs, and the carry adder 1102 having $n_b+1$ (=$\log_2(n)+1$) bits. FIG. 13 is a view showing an example of the arrangement of the ($n_b+1$)-bit carry adder 1102. The carry adder 1102 comprises ($n_b+1$) full adders 1121. Sum signals (solid lines) from the full adders 1121 are directly used as output signals of the individual bits, and carry signals (dotted lines) from the full adders 1121 propagate in turn from the least-significant-bit full adder 1121 to the most-significant-bit full adder 1121. Also, the output from the tree adder 1101 is input to the full adders 1121 from the least significant bit to the ($a_b+1$)th bit.

In the row adder 106 shown in FIG. 11, each signal from the set of a data buses is formed into an ($a_b+1$)-bit signal by the tree adder 1101, and these signals are added in turn from the right side in FIG. 11 by the ($n_b+1$)-bit carry adders 1102, thereby adding the processing results from the cells 101 arranged into m (rows)×n (columns). Note that if one input terminal of each full adder is kept unused, half adders may also be used. Note also that not all the carry adders 1102 need be ($n_b+1$)-bit adders. For example, in FIG. 11, it is also possible to allocate ($a_b+1$) bits to the rightmost carry adder 1102, ($\log_2(2\times a)+1$) bits to the carry adder 1102 of the second set from the right side, and ($\log_2(b\times a)+1$) bits, i.e., ($n_b+1$) bits, to the carry adder 1102 of the bth set.

Figure 14:
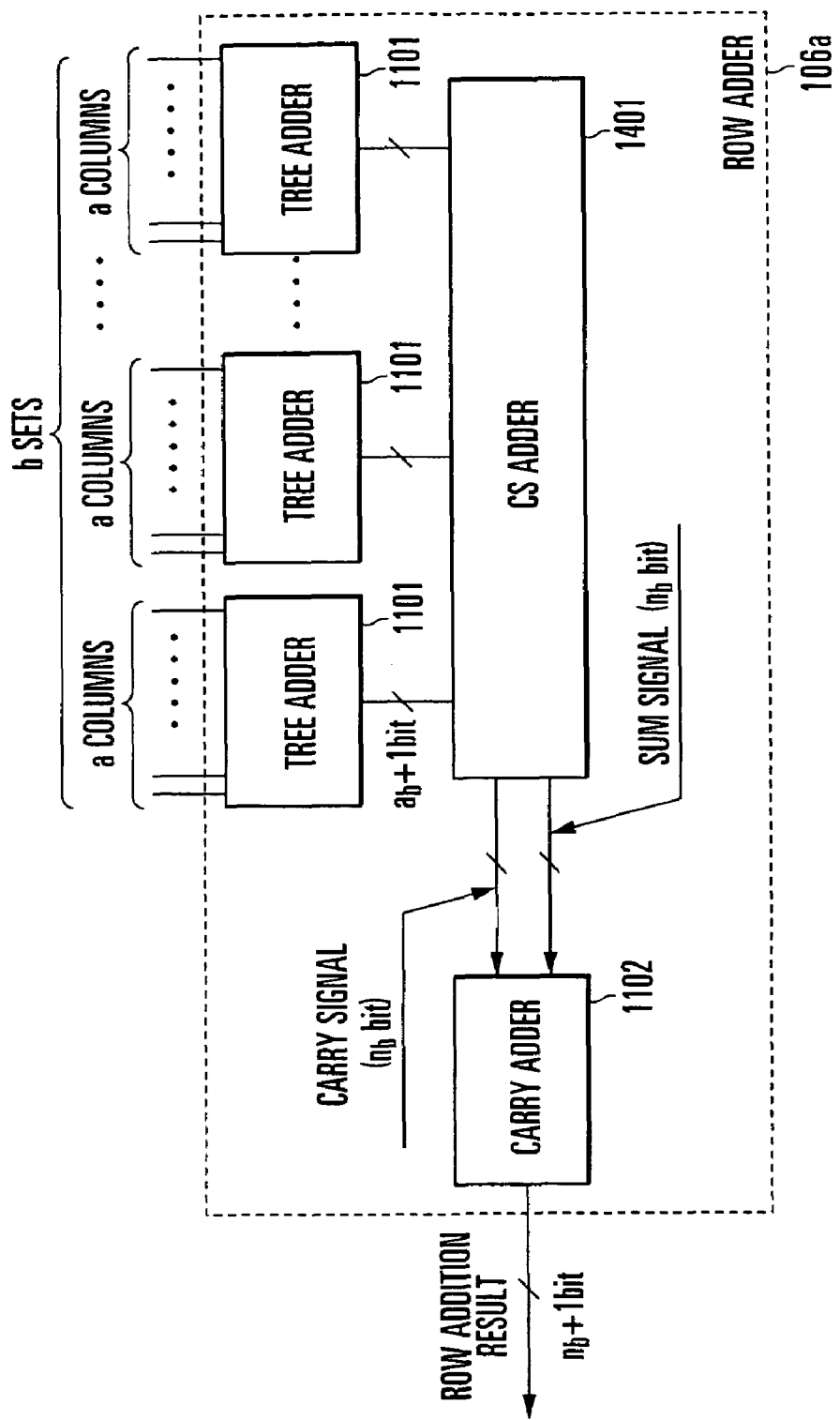
FIG. 14 is a view showing an example of the arrangement of a row adder.

Another example of the arrangement of the row adder will be explained below. FIG. 14 is a view showing another example of the arrangement of the row adder forming the parallel processing apparatus. A row adder 106a shown in FIG. 14 comprises a plurality of tree adders 1101, a CS (Carry Save) adder 1401, and a carry adder 1102. The tree adder 1101 and carry adder 1102 are similar to those shown in FIGS. 11, 12, and 13, so an explanation thereof will be omitted.

Figure 15:
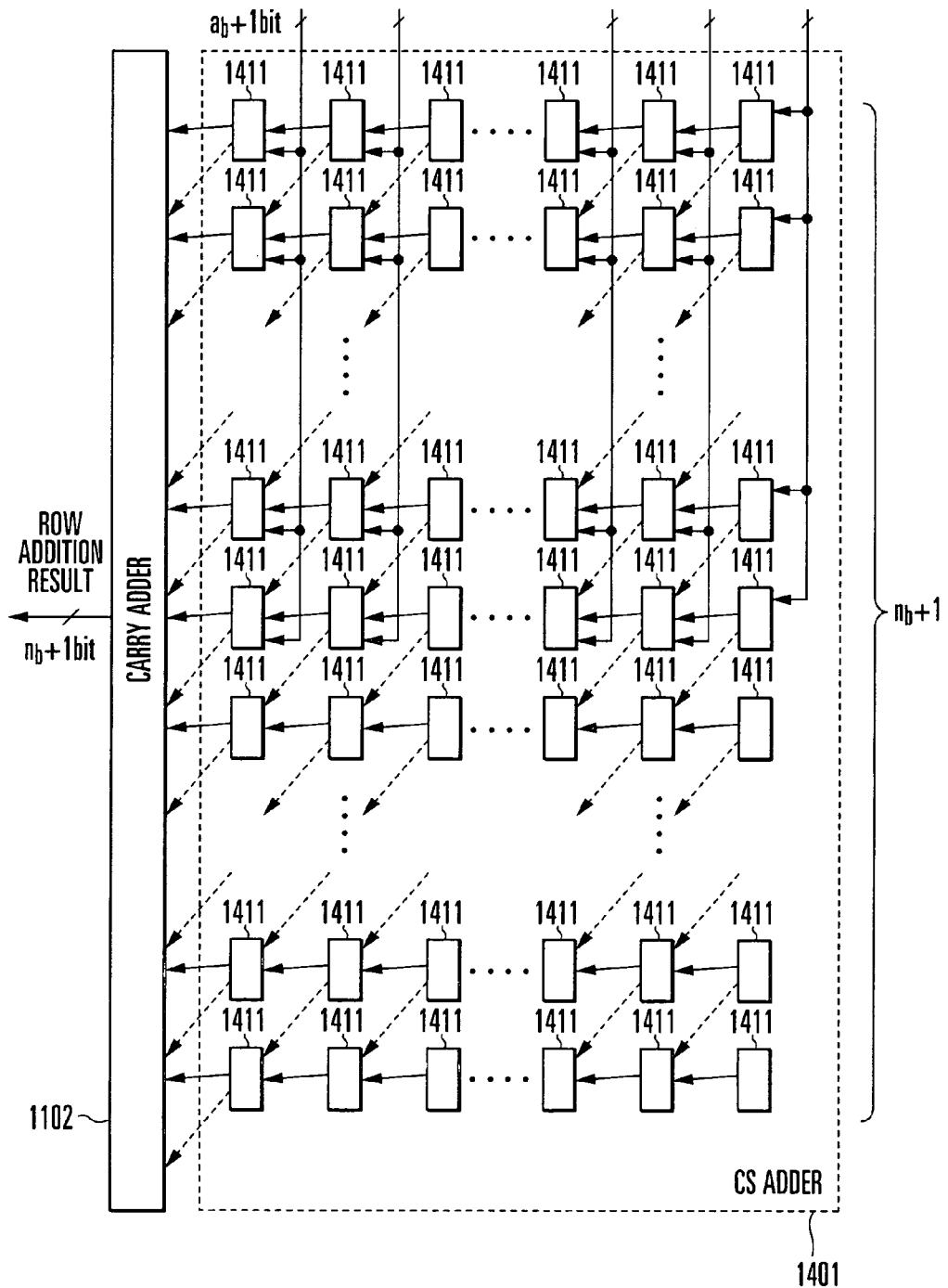
FIG. 15 is a view showing an example of the arrangement of a CS adder.

The CS adder 1401 will be described below. As shown in FIG. 15, the CS adder 1401 has ($n_b+1$) full adders 1411 for an output from one tree adder 1101. A sum signal (solid line) output from each of the full adders 1411 corresponding to an output from one tree adder 1101 is input to the adjacent full adder 1411 on the left side in the same bit position. Also, a carry signal (dotted line) output from each of the full adders 1411 corresponding to an output from one tree adder 1101 is input to the adjacent full adder 1411 on the left side in a bit position higher by one bit. An output from each tree adder 1101 is input to the full adders 1411 from the least significant bit to the ($a_b+1$)th bit.

As shown in FIG. 14, the carry adder 1102 receives the output sum signal ($n_b$ bits) and carry signal ($n_b$ bits) from the CS adder 1401, and outputs an ($n_b+1$)-bit row addition result. The row adder 106a shown in FIG. 14 uses the CS adder 1401. Therefore, unlike in the row adder 106 shown in FIG. 11, the carry signals from the carry adders 1102 need not be propagated from lower bits to higher bits. As a consequence, a critical path can be greatly shortened in the CS adder 1401, so the processing speed can be made higher than that of the row adder 106 shown in FIG. 11.

Also, the CS adder 1401 has regularity in connection, and hence has the characteristic feature that the designing work is easier than that for the arrangement of the row adder 106 shown in FIG. 11. Note that if one input terminal of each full adder 1411 is kept unused, half adders may be used. Note also that not all the stages of the CS adder 1401 need be ($n_b+1$)-bit stages. For example, it is also possible to allocate ($a_b+1$) bits to the column of the full adders 1411 in the rightmost stage, ($\log_2(2\times a)+1$) bits to the column of the full adders 1411 in the second stage from the right side, and ($\log_2(b\times a)+1$) bits, i.e., ($n_b+1$) bits, to the column of the full adders 1411 in the bth stage.

Figure 16:
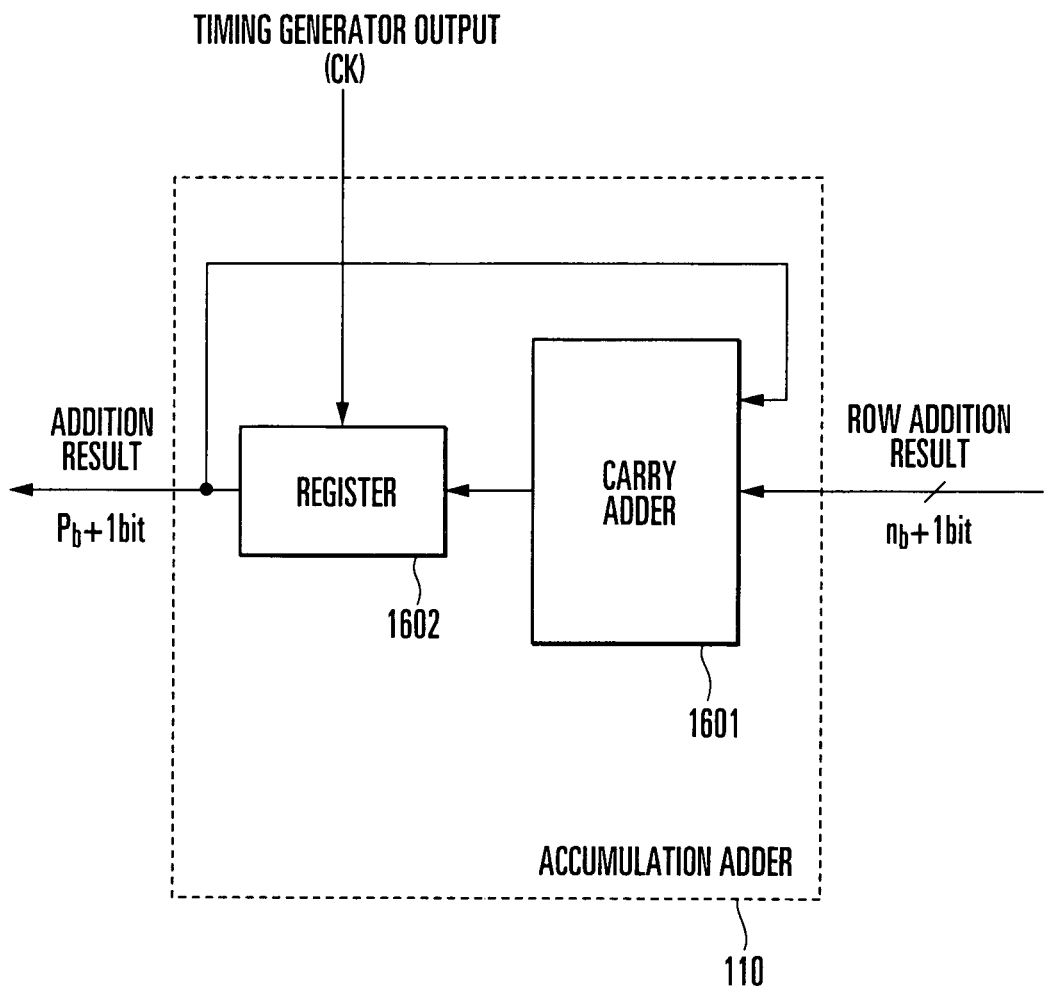
FIG. 16 is a view showing an example of the arrangement of an accumulation adder.

In each arrangement described above, the accumulation adder 110 can be made up of a carry adder 1601 and register 1602 as shown in FIG. 16. When the number of the arrayed cells 101 is P, the carry adder 1601 is a ($P_b+1$ (=$\log_2(P)+1$))-bit carry adder, and the register 1602 is a ($P_b+1$)-bit register.

The row addition results output from the row adder 106 (row adder 106a) are added one by one by the carry adder 1601 in synchronism with the output from the register 1602 and a clock generator output (CK). Whenever CK is input to the register 1602 and the row addition result changes in synchronism with CK, data temporarily saved in the register 1602 is updated, thereby adding the row addition results of the individual rows, and adding the processing results of the plurality of cells 101.

Figure 17:
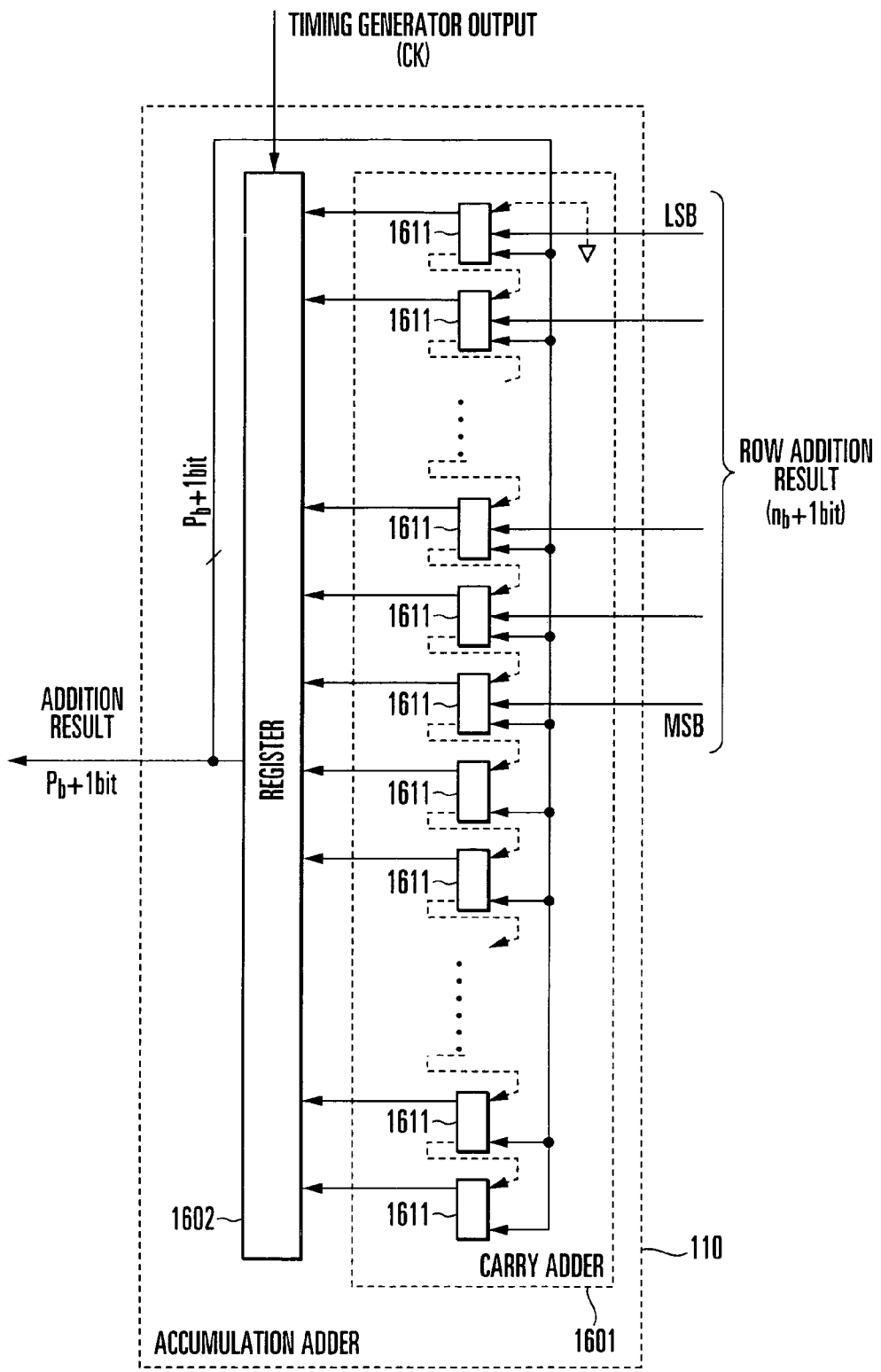
FIG. 17 is a view showing an example of the arrangement of a carry adder.

As shown in FIG. 17, for example, the carry adder 1601 can be made up of ($P_b+1$) full adders 1611. In the carry adder 1601, a row addition result output from the row adder 106 (row adder 106a) is input to the full adders 1611 from the least significant bit to the ($n_b+1$)th bit. Sum signals (solid lines)

from the full adders 1611 are directly used as output signals of the individual bits, and carry signals (dotted lines) from the full adders 1611 propagate from the full adders 1611 of lower bits to the full adders 1611 of upper bits. Also, a ($P_b$+1)-bit signal output from the register 1602 is input to ($P_b$+1) full adders 1611.

Figure 18:
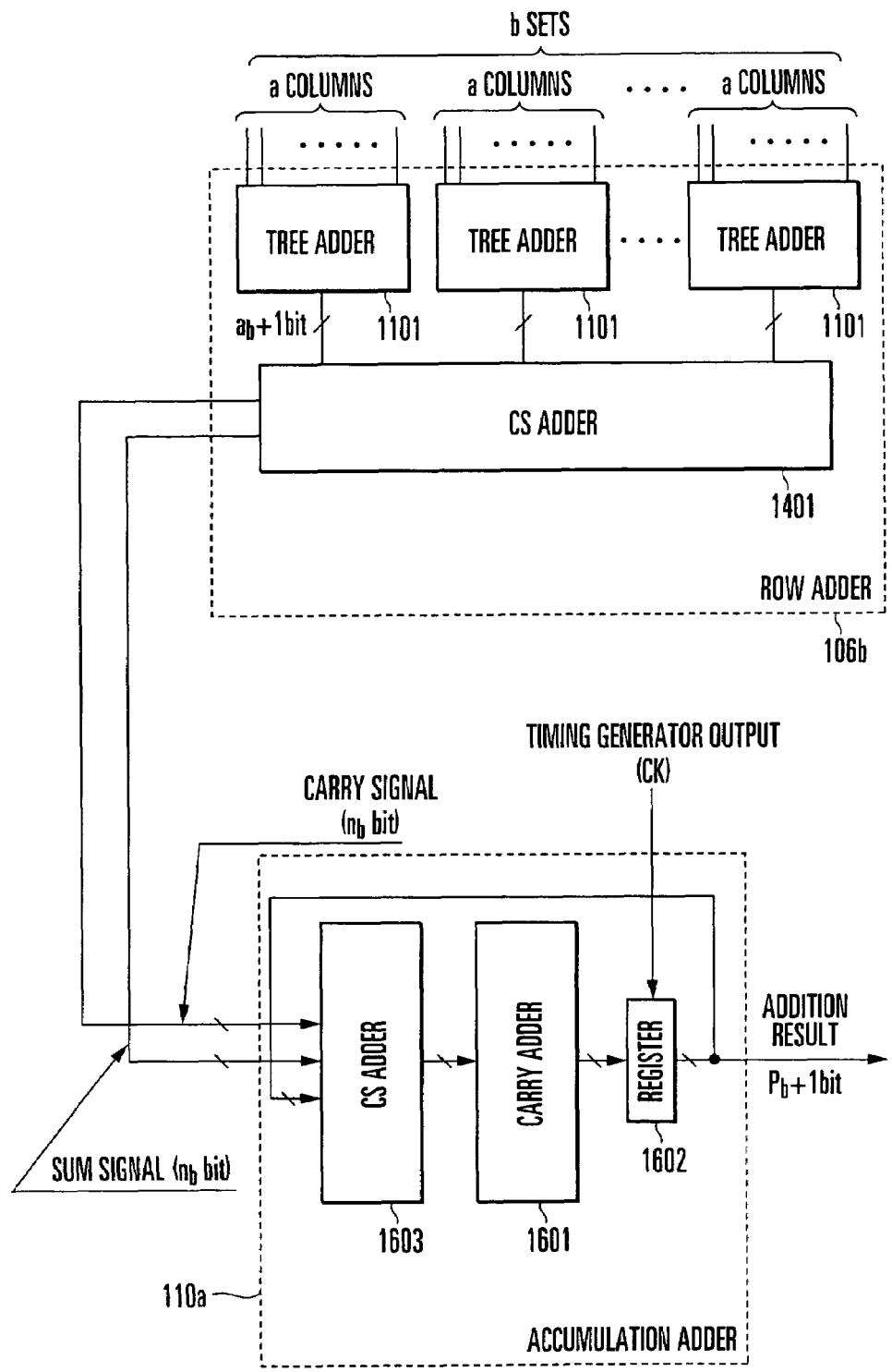
FIG. 18 is a view showing examples of the arrangements of a row adder and accumulation adder.

Furthermore, as shown in FIG. 18, the row adder 106 and accumulation adder 110 of the parallel processing apparatus shown in FIG. 1 may also be a row adder 106*b* comprising a plurality of tree adders 1101 and a CS adder 1401, and an accumulation adder 110*a* comprising a carry adder 1601, register 1602, and CS adder 1603, respectively. The tree adder 1101, CS adder 1401, and carry adder 1601 have the same arrangements as shown in FIGS. 12, 15, and 17, respectively.

As shown in FIG. 18, the accumulation adder 110*a* is obtained by adding the CS adder 1603 to the accumulation adder 110 shown in FIG. 16. In the accumulation adder 110*a*, the CS adder 1603 first processes three data, i.e., a sum signal and carry signal output from the CS adder 1401 in the row adder 106*a*, and an output signal from the register 1602.

Figure 19:
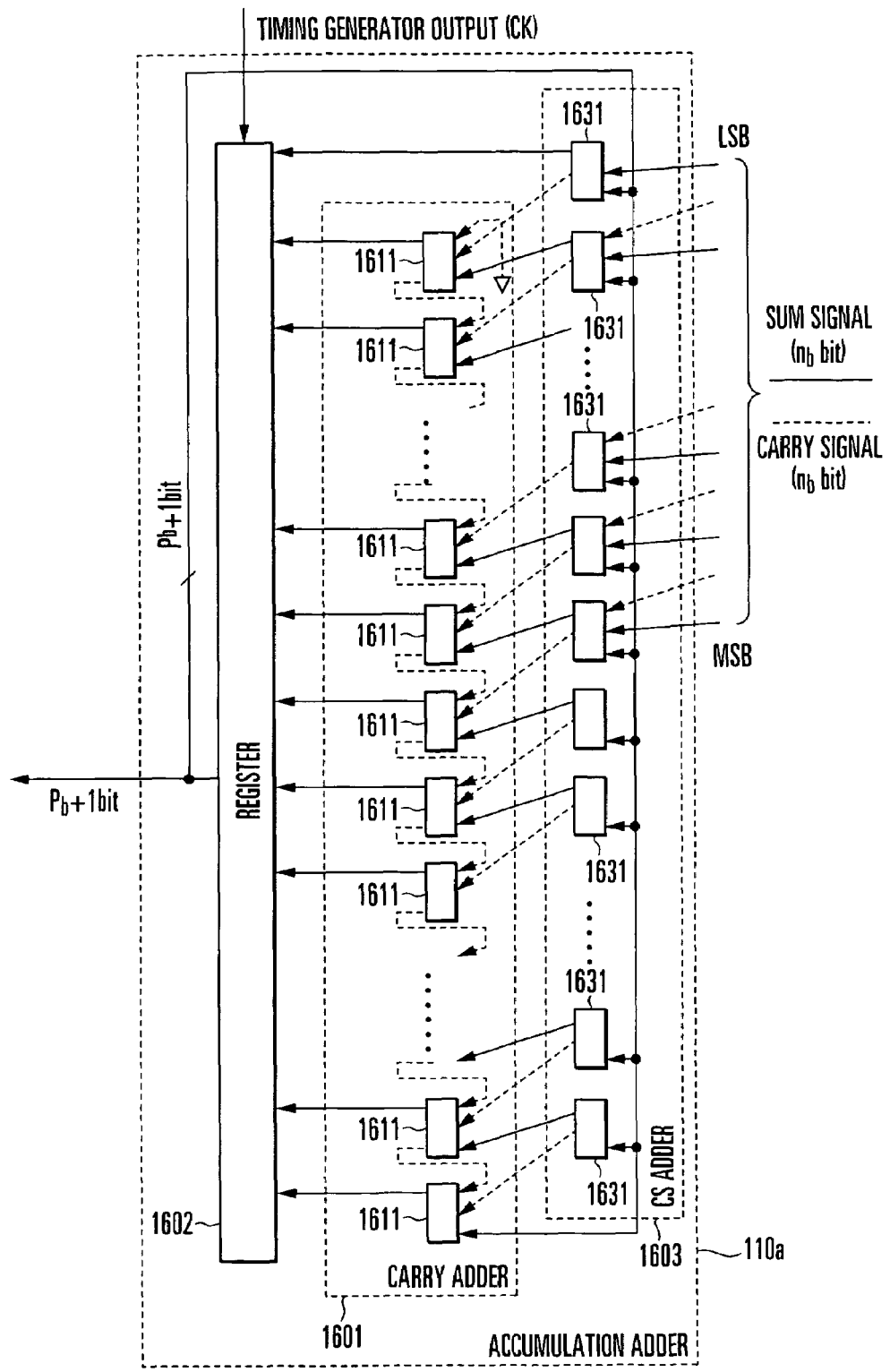
FIG. 19 is a view showing a more detailed example of the arrangement of the accumulation adder.

As shown in FIG. 19, the CS adder 1603 is made of ($P_b$+1) full adders 1631.

First, the $n_b$-bit sum signals (solid lines) and $n_b$-bit carry signals (dotted lines) output from the CS adder 1401 of the row adder 106*b* are input to full adders 1631 from the least significant bit to the ($n_b$+1)th bit in the CS adder 1603. Also, the ($P_b$+1)-bit signal output from the register 1602 is input to all the full adders 1631.

Sum signals (solid lines) and carry signals (dotted lines) output form the full adders 1631 are input to the ($P_b$+1) full adders 1611 of the carry adder 1601. Note that a sum signal of the least significant bit is directly output to the register 1602.

Carry signals (dotted lines) from the full adders 1611 which have received the signals from the full adders 1631 propagate from the full adders 1611 of lower bits to the full adders 1611 of upper bits, and sum signals (solid lines) from the full adders 1611 are output as signals of the individual bits to the register 1602.

In the arrangement of the row adder 106*b* and accumulation adder 110*a* shown in FIG. 18, the accumulation adder 110*a* includes the CS adder 1603. This eliminates the carry adder 1102 in the row adder 106*a* shown in FIG. 14. In the arrangement shown in FIG. 18 as described above, a carry adder can be replaced with a CS adder. This makes it possible to shorten the critical path, and increase the processing speed of addition.

Figure 20:
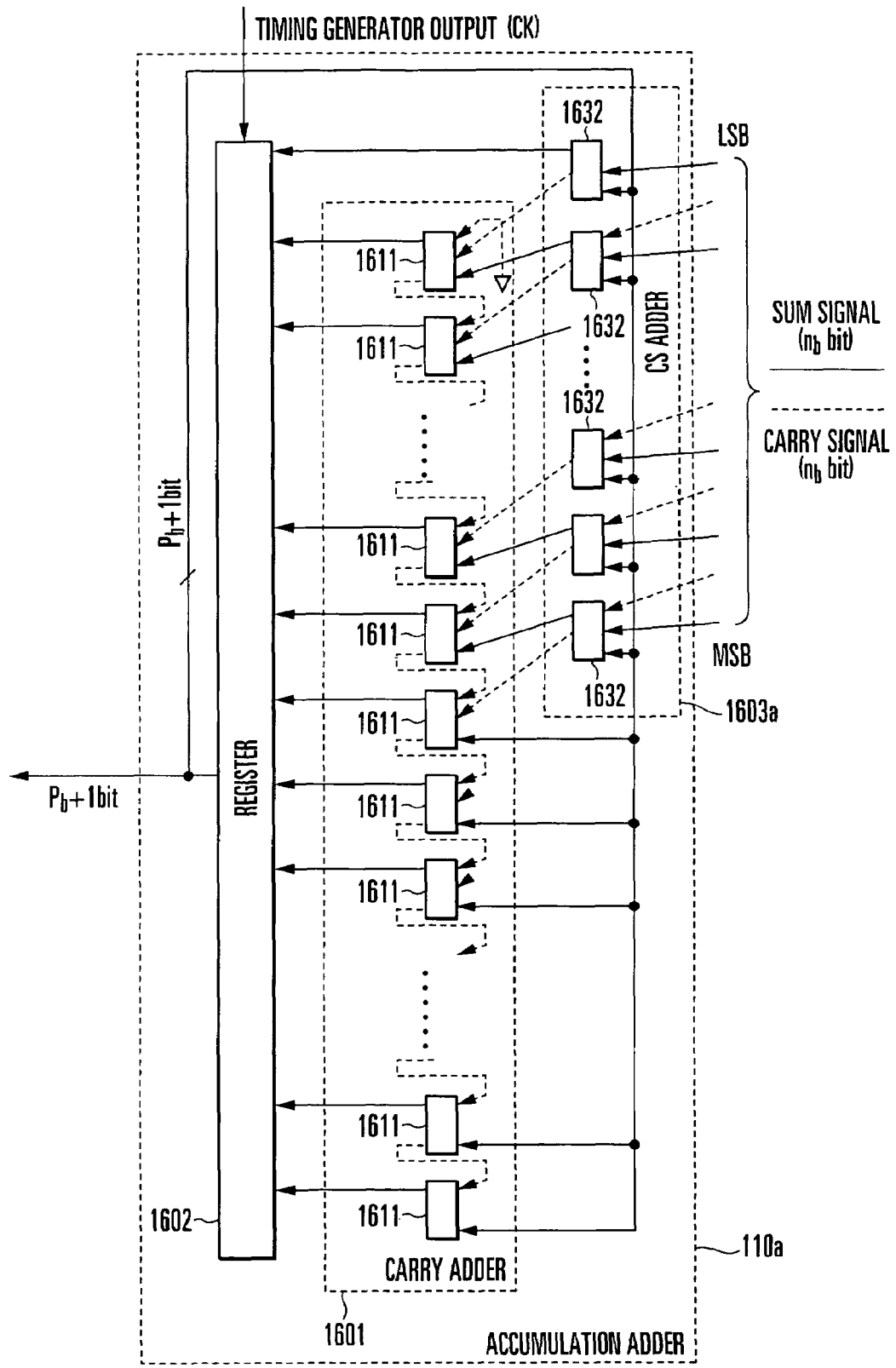
FIG. 20 is a view showing a more detailed example of the arrangement of the accumulation adder.
Figure 21:
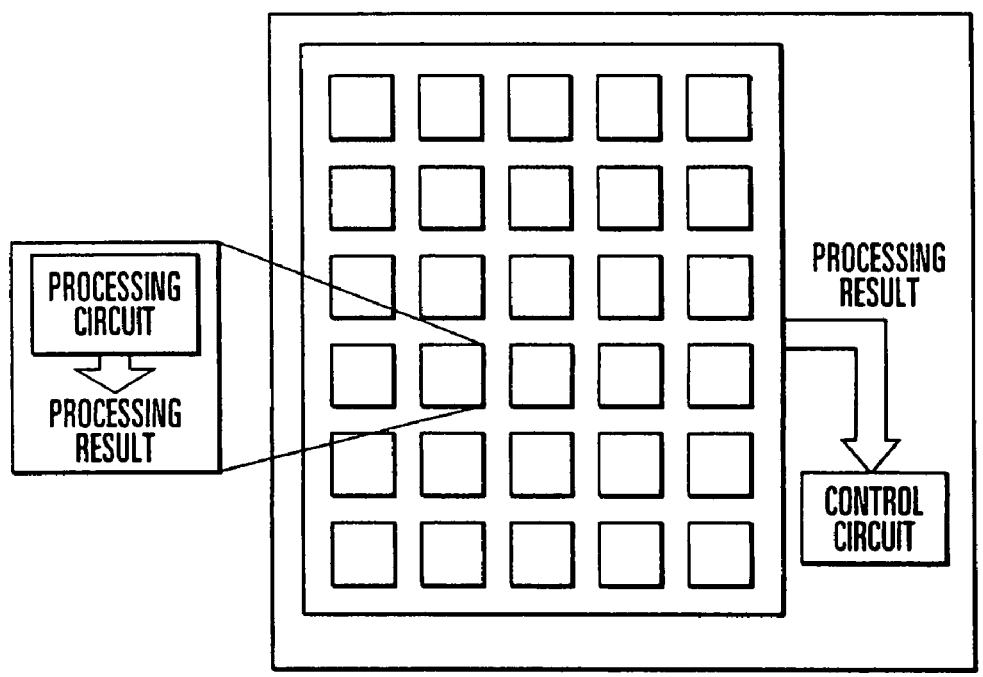
FIG. 21 is a view simply illustrating the arrangement of a general parallel processing apparatus.

In the accumulation adder 110*a* shown in FIG. 19, if one input terminal of each full adder is kept unused, half adders may be used. As shown in FIG. 20, it is also possible to use a CS adder 1603*a* made up of $n_b$ full adders 1631. As shown in FIG. 19, the ($n_b$+1)th to ($P_b$+1)th full adders 1631 in the CS adder 1603 do not perform any addition process. Therefore, the arrangement as shown in FIG. 20 from which these full adders are removed may also be used.

In the present invention as has been explained above, a select signal line of a set row is selected, processing results from processors of this row are output to a data output line, and processing results output to a data output line of a set column are added. Consequently, the present invention achieves the effects of totalizing processing results from a plurality of cells to be processed in parallel more rapidly and more accurately than in the conventional apparatuses, and totalizing processing results from given cells to be processed.

The parallel processing apparatus according to the present invention described above can be applied to a fingerprint verification apparatus which senses the shape of a fingerprint and compares it with a registered shape.

The invention claimed is:
1. A parallel processing apparatus comprising:
a plurality of cells arrayed in a matrix of rows and columns;
a plurality of select signal lines formed in one-to-one correspondence with each row of the matrix;
row range setting means for selecting one of said plurality of select signal lines in accordance with a set row range;
row address signal generating means for outputting, at a predetermined interval, an address signal for selecting the select signal line selected by said row range setting means;
row decoding means for outputting a select signal to the select signal line selected by the address signal output from said row address signal generating means;
a processor which is formed in each cell, connects to said select signal line for each row of the matrix, performs predetermined processing, and outputs a result of the processing when the select signal is input via said select signal line;
a data output line which is formed for each column of the matrix, connects to said processors in each column, and propagates results of the processing output from said processors;
column range selecting means for selecting one of said data output lines in accordance with a set column range;
row adding means for adding, for each row of the matrix, processing results output to a data output line selected by said column range selecting means, and outputting a row addition result; and
accumulation adding means for adding, in synchronism with the predetermined interval, the row addition results of individual rows output from said row adding means, and outputting an addition result as a totalization result;
wherein said column range selecting means comprises:
an output enabling circuit which is formed for each column of the matrix, and controls signal output from said data output line to said row adding means;
a column range setting means in which the column range is set; and
an output enable signal generator which holds data of the column range set in said column range setting means and which for each column of the set column range for which the data are thus held generates and simultaneously outputs an output enable signal corresponding to said set column range for controlling an output of said output enabling circuit, wherein said output enable signal generator comprises:
a storage circuit which is formed for each column of the matrix, and outputs a set inversion enable signal;
an initializing circuit which initializes said storage circuit;
a column decoding circuit which sets an inversion enable signal in said storage circuit;
an inverter which is formed for each column of the matrix, receives two input signals one of which is an inversion enable signal output from said storage circuit in the same column, and, on the basis of the set inversion enable signal input as one input signal, inverts and outputs the other input signal as the output enable signal to said output enabling circuit;
an initial value setting circuit which outputs an initial value as the other input signal to said inverter at one end of a row of inverters; and
a column address signal generator which generates a column address signal for designating a column address in accordance with the column range set in said column range setting means, said column decoding circuit makes an inversion enable signal to be set for said stor- age circuit corresponding to a column address signal generated by said column address signal generator, different from an inversion enable signal to be set for the rest of said storage circuits, and said inverter outputs a signal as the other input signal to an inverter in a next column at the other end of the matrix, and receives, as the other input signal, an output enable signal which is output from an inverter in a preceding column at one end of the matrix.

2. The parallel processing apparatus according to claim 1, wherein said output enable signal generator comprises:
a storage circuit which outputs an inversion enable signal;
an initializing circuit which initializes said storage circuit;
a column decoding circuit which sets the inversion enable signal in said storage circuit;
an inverter which receives two input signals, a first input signal is the inversion enable signal output from said storage circuit in the same column, the inverter outputs an inverted signal by inverting a second input signal on the basis of the first input signal;
a logic circuit which outputs a result of a logic operation of the inversion enable signal and the inverted signal as the output enable signal to said output enabling circuit;
an initial value setting circuit which outputs an initial value as the second input signal to said inverter at one end of a row of inverters; and
a column address signal generator which generates a column address signal for designating a column address in accordance with the column range set in said column range setting means, said column decoding circuit makes the inversion enable signal to be set for said storage circuit corresponding to the column address signal generated by said column address signal generator, different from another inversion enable signal to be set for the rest of said storage circuits, and said inverter outputs a signal as the other input signal to an inverter in a next column at the other end of the matrix, and receives, as the other input signal, an inverted signal which is output from an inverter in a preceding column at one end of the matrix.

3. The parallel processing apparatus according to claim 1, wherein said row adding means comprises:
a plurality of tree adders which totalize processing results input from said plurality of data output lines, and
carry adders which are formed in one-to-one correspondence with said plurality of tree adders and add a plurality of totalization results output from said plurality of tree adders.

4. The parallel processing apparatus according to claim 1, wherein said row adding means comprises:
a plurality of tree adders which totalize processing results input from said plurality of data output lines,
a carry save adder which adds a plurality of totalization results output from said plurality of tree adders, and
a carry adder which adds a sum signal and a carry signal output from said carry save adder.

5. The parallel processing apparatus according to claim 1, wherein said row adding means comprises:
a plurality of tree adders which totalize processing results input from said plurality of data output lines,
a first carry save adder which adds a plurality of totalization results output from said plurality of tree adders, and
said accumulation adding means comprises:
a register in which an addition result is stored,
a second carry save adder which adds a signal output from said register and a sum signal and a carry signal output from said first carry save adder, and
a carry adder which adds a second sum signal and a second carry signal output from said second carry save adder, and an addition result from said carry adder is output to said register.

6. A parallel processing apparatus according to claim 1, wherein said processor comprises:
a sensor element which senses a capacitance;
a sensor circuit which converts the capacitance sensed by said sensor element into an electrical signal, and the sensor circuit outputs digital data;
a recorder in which a registered shape is recorded; and
a comparator which compares the output from said sensor circuit with the registered shape recorded in said recorder, and the comparator outputs a comparison result.

* * * * *